US009225693B2

(12) United States Patent
Wu et al.

(10) Patent No.: US 9,225,693 B2
(45) Date of Patent: Dec. 29, 2015

(54) MAJOR MANAGEMENT APPARATUS, AUTHORIZED MANAGEMENT APPARATUS, ELECTRONIC APPARATUS FOR DELEGATION MANAGEMENT, AND DELEGATION MANAGEMENT METHODS THEREOF

(71) Applicant: Institute For Information Industry, Taipei (TW)

(72) Inventors: Jui-Ming Wu, New Taipei (TW); You-Lian Huang, Taoyuan (TW); Chih-Chiang Hsieh, Taipei (TW); Emery Jou, Taipei (TW)

(73) Assignee: Institute For Information Industry, Taipei (TW)

( * ) Notice: Subject to any disclaimer, the term of this patent is extended or adjusted under 35 U.S.C. 154(b) by 0 days.

(21) Appl. No.: 14/605,671

(22) Filed: Jan. 26, 2015

(65) Prior Publication Data

US 2015/0180838 A1    Jun. 25, 2015

Related U.S. Application Data

(62) Division of application No. 13/769,349, filed on Feb. 17, 2013, now Pat. No. 9,003,193.

(30) Foreign Application Priority Data

Dec. 12, 2012    (TW) .............................. 101146852 A

(51) Int. Cl.
*H04L 29/06* (2006.01)
*H04L 9/32* (2006.01)
*H04W 12/08* (2009.01)

(52) U.S. Cl.
CPC ............ *H04L 63/0428* (2013.01); *H04L 9/321* (2013.01); *H04L 63/08* (2013.01); *H04L 63/0807* (2013.01); *H04L 63/10* (2013.01); *H04W 12/08* (2013.01)

(58) Field of Classification Search
CPC ....................................................... H04L 9/321
USPC ........................................................ 713/170
See application file for complete search history.

(56) References Cited

U.S. PATENT DOCUMENTS 6,937,726 B1 * 8/2005 Wang .................... H04L 9/0891
380/273
7,770,212 B2    8/2010 Le Saint
(Continued)

OTHER PUBLICATIONS

D. Wallner, E Harder, R. Agee, Key Management for Multicast: Issues and Architectures, Network Working Group Request for Comments: 2627, Jun. 1999, 24 pages.
(Continued)

*Primary Examiner* — Jason K Gee
(74) *Attorney, Agent, or Firm* — Skaar Ulbrich Macari, P.A.

(57) ABSTRACT

A major management apparatus, an authorized management apparatus, an electronic apparatus for delegation management, and delegation management methods thereof are provided. The major management apparatus generates a first and a second delegation deployment messages and respectively transmits them to the authorized management apparatus and the electronic apparatus. The authorized management apparatus encrypts an original authorized operation message into an authorized operation message by an authorization key included in the first delegation deployment message and transmits the authorized operation message to the electronic apparatus. The original authorized operation message includes an operation task message and a right level. The electronic apparatus decrypts the authorized operation message into the original authorized operation message by the authorization key included in the second delegation deployment message and performs an operation according to the operation task message and the right level.

10 Claims, 17 Drawing Sheets

(56) References Cited

U.S. PATENT DOCUMENTS

| | | |
|---|---|---|
| 8,201,215 B2 | 6/2012 | Dillaway et al. |
| 2003/0005135 A1* | 1/2003 | Inoue .................. G06F 21/10 709/229 |
| 2003/0061477 A1 | 3/2003 | Kahn et al. |
| 2004/0034774 A1* | 2/2004 | Le Saint .................. G06F 21/34 713/169 |
| 2005/0114666 A1 | 5/2005 | Sudia |
| 2011/0058405 A1 | 3/2011 | Chen et al. |
| 2011/0158405 A1 | 6/2011 | Choi et al. |
| 2011/0271110 A1 | 11/2011 | Ohba et al. |
| 2012/0011360 A1* | 1/2012 | Engels .................. H04L 9/006 713/166 |
| 2013/0041828 A1 | 2/2013 | Gonzalez et al. |

OTHER PUBLICATIONS

Office Action to U.S. Appl. No. 13/714,342 rendered by the United States Patent and Trademark Office on Apr. 7, 2014, 50 pages.

* cited by examiner

MAJOR MANAGEMENT APPARATUS, AUTHORIZED MANAGEMENT APPARATUS, ELECTRONIC APPARATUS FOR DELEGATION MANAGEMENT, AND DELEGATION MANAGEMENT METHODS THEREOF

PRIORITY

This application is a divisional of U.S. patent application Ser. No. 13/769,349 filed on Feb. 17, 2013, which claims the benefit from the priority of Taiwan Patent Application No. 101146852 filed on Dec. 12, 2012, the disclosures of both of which are incorporated by reference herein in their entirety.

FIELD

The present invention relates to an authorized management apparatus for delegation management and delegation management method thereof. More particularly, the present invention relates to an authorized management apparatus and delegation management method thereof that perform management operations through delegation management.

BACKGROUND

The network technologies have been developed for many years. FIG. 1A depicts a schematic architecture of a conventional network system 1. The network system 1 comprises a server 11, a gateway 15, and a plurality of electronic apparatuses 17. The server 11 connects to the gateway 15 via the Internet 13 and connects to the electronic apparatuses 17 via the gateway 15. In recent years, this architecture of the network system 1 is often used in Internet of Things (IoT) systems, for example, in Advanced Metering Infrastructure (AMI) systems. When the network system 1 is an AMI system, the server 11 may be a meter data management system (MDMS), the gateway 15 may be a concentrator, and the electronic apparatuses 17 may each be a smart meter.

When the network system 1 is an IoT system, the server 11 has to access information (e.g., read power consumption data collected and stored in the smart meters, set the Time of Use (TOU) parameters of the smart meters, control statuses (On or Off) of power supply switches in the smart meters, activate and execute the firmware updating function of the smart meters, and so on) from the electronic apparatuses 17 frequently. Since the network system 1 is often of a very large scale, the number of the electronic apparatuses 17 is great (e.g., in an AMI system, the number of the smart meters is usually on the order of millions) and the access operations of the electronic apparatuses 17 are very complex. When the operations are executed in the aforesaid centralized way (i.e., all the electronic apparatuses 17 are accessed by the server 11 directly), a poor efficiency is often caused. Therefore, a distributed operation mode has to be adopted in which the server delegates the right of accessing the electronic apparatuses 17 to the gateways 15 so that the gateways 15 are authorized to execute the operations. The distributed operation mode can improve the operation efficiency.

Please refer to FIG. 1B. In the distributed system environment, when a system 112 (i.e., a delegator) delegates another system 113 (i.e., a delegatee) to access resources from a service system 114 according to the prior art, the system (delegator) 112 issues an authorization credential to the system (delegatee) 113 and then the system (delegatee) 113 generates an access request according to the right authorized and transmits the authorization credential and the access request to the service system 114. After checking and verifying related rights, the service system 114 executes the access operation.

The authorization credential mainly comprises an identity of the delegator, an identity of the delegate, a privilege and so on, which may be in the form of the X.509 Privilege Attribute Certificate, the Kerberos Ticket, or various forms of Delegation Certificate. In practical operations, the access request does not comprise the privilege information, so it must be used in combination with the authorization credential. In addition, message verification and relevance check must be performed by the service system 114 on the authorization credential and the access request. Therefore, the operations are relatively complex. Moreover, the meaning of the privilege is not specified in the two messages, so the privilege must be interpreted and controlled by the service system 114 independently. Therefore, related security problems are likely to occur due to the inexplicit definition. Furthermore, although the access data is carried in the authorization credential in another implementation, the system (delegatee) 113 cannot independently generate the access request message as needed according to the right authorized in this implementation because the authorization credential can only be generated by the system (delegator) 112. As a result, this implementation not only has poor flexibility in use, but the system (delegator) 112 must also generate an authorization credential for each access operation, which causes a heavy workload of this system. When this implementation is applied to the aforesaid IoT system, the effect of distributed processing cannot be achieved. Accordingly, an urgent need exists in the art to provide a delegation mechanism that is simple and flexible in use so as to solve the aforesaid problems.

SUMMARY

To solve the aforesaid problems, the present invention provides a major management apparatus, an authorized management apparatus, an electronic apparatus for delegation management, and delegation management methods thereof.

The major management apparatus for delegation management according to certain embodiments of the present invention is suitable for use in a network system. The network system comprises the major management apparatus, an authorized management apparatus, and an electronic apparatus. The major management apparatus comprises a processing unit and a transceiving interface electrically connected to the processing unit.

The processing unit is configured to generate a first delegation deployment message and a second delegation deployment message. The first delegation deployment message comprises an authorization key, a right level, and a right token. The second delegation deployment message comprises the authorization key and a right verification message.

The transceiving interface is configured to transmit the first delegation deployment message to the authorized management apparatus so that the authorized management apparatus uses the authorization key to encrypt an original authorized operation message into an authorized operation message. The transceiving interface further transmits the second delegation deployment message to the electronic apparatus so that the electronic apparatus uses the authorization key to decrypt the authorized operation message from the authorized management apparatus into the original authorized operation message and so that the electronic apparatus performs a verification procedure by the right verification message as well as the right level and an operation task message comprised in the original authorized operation message and executes an operation according to the right level and the operation task message.

The authorized management apparatus for delegation management according to certain embodiments of the present invention is suitable for use in a network system. The network system comprises the authorized management apparatus, a major management apparatus, and an electronic apparatus. The authorized management apparatus comprises a first transceiving interface, a storage unit, a processing unit, and a second transceiving interface. The processing unit is electrically connected to the first transceiving interface, the storage unit, and the second transceiving interface. The first transceiving interface is configured to receive a delegation deployment message from the major management apparatus. The storage unit is configured to store an authorization key, a right level, and a right token comprised in the delegation deployment message.

The processing unit is configured to perform a verification pattern calculation by the authorization key, the right token, the right level, and an operation task message and encrypt an original authorized operation message into an authorized operation message by the authorization key. The original authorized operation message comprises the operation task message and the right level. The second transceiving interface is configured to transmit the authorized operation message to the electronic apparatus so that the electronic apparatus performs a verification procedure by a right verification message as well as the right level and the operation task message comprised in the original authorized operation message and so that the electronic apparatus executes an operation according to the right level and the operation task message.

The electronic apparatus for delegation management according to certain embodiments of the present invention is suitable for use in a network system, wherein the network system comprises the electronic apparatus, a major management apparatus, and an authorized management apparatus. The electronic apparatus comprises a transceiving interface, a storage unit, and a processing unit electrically connected to the transceiving interface and the storage unit. The transceiving interface is configured to receive a delegation deployment message from the major management apparatus and receive an authorized operation message from the authorized management apparatus. The storage unit is configured to store an authorization key and a right verification message comprised in the delegation deployment message. The processing unit is configured to decrypt the authorized operation message into an original authorized operation message by the authorization key so as to obtain an operation task message and a right level. The processing unit further performs a verification pattern calculation by the right level and the operation task message comprised in the original authorized operation message, the authorization key, and the right verification message, and executes an operation according to the right level and the operation task message.

The delegation management method according to certain embodiments of the present invention is suitable for use in a major management apparatus. A network system comprises the major management apparatus, an authorized management apparatus, and an electronic apparatus.

The delegation management method comprises the following steps of:

(a) generating a first delegation deployment message, wherein the first delegation deployment message comprises an authorization key, a right level, and a right token;

(b) generating a second delegation deployment message, wherein the second delegation deployment message comprises the authorization key and a right verification message;

(c) transmitting the first delegation deployment message to the authorized management apparatus so that the authorized management apparatus uses the authorization key to encrypt an original authorized operation message into an authorized operation message; and (d) transmitting the second delegation deployment message to the electronic apparatus so that the electronic apparatus uses the authorization key to decrypt the authorized operation message from the authorized management apparatus into the original authorized operation message, performs a verification procedure by the right level and an operation task message comprised in the original authorized operation message and the right verification message, and executes an operation according to the right level and the operation task message.

The delegation management method according to certain embodiments of the present invention is suitable for use in an authorized management apparatus. A network system comprises the authorized management apparatus, a major management apparatus, and an electronic apparatus. The delegation management method comprises the following steps of:

(a) receiving a delegation deployment message from the major management apparatus;

(b) performing a verification pattern calculation by an operation task message, and an authorization key, a right token, and a right level comprised in the delegation deployment message;

(c) encrypting an original authorized operation message into an authorized operation message by the authorization key, wherein the original authorized operation message comprises the operation task message and the right level; and (d) transmitting the authorized operation message to the electronic apparatus so that the electronic apparatus performs a verification procedure by a right verification message as well as the right level and the operation task message comprised in the original authorized operation message and so that the electronic apparatus executes an operation according to the right level and the operation task message.

The delegation management method according to certain embodiments of the present invention is suitable for use in an electronic apparatus. A network system comprises the electronic apparatus, a major management apparatus, and an authorized management apparatus. The delegation management method comprises the following steps of:

(a) receiving a delegation deployment message from the major management apparatus;

(b) receiving an authorized operation message from the authorized management apparatus;

(c) decrypting the authorized operation message into an original authorized operation message by an authorization key comprised in the delegation deployment message so as to obtain an operation task message and a right level;

(d) performing a verification pattern calculation by the right level and the operation task message comprised in the original authorized operation message, the authorization key, and a right verification message; and (e) executing an operation according to the right level and the operation task message.

According to certain embodiments of the present invention, the major management apparatus generates a first delegation deployment message and a second delegation deployment message and transmits the first delegation deployment message and the second delegation deployment message to the authorized management apparatus and the electronic apparatus respectively. Then, when the authorized management apparatus is to manage/access the electronic apparatus, the authorized management apparatus generates an original authorized operation message and encrypts the original authorized operation message into an authorized operation message by an authorization key comprised in the first delegation deployment message. The original authorized operation message generated by the authorized management apparatus comprises an operation task message and a right level, so the electronic apparatus can execute an operation according to the right level and the operation task message.

In the aforesaid mechanism of certain embodiments of the present invention, the authorized management apparatus and the delegation management method thereof may perform the verification pattern calculation in one of three different ways. The three ways include:

(1) performing the verification pattern calculation by the authorization key, the right token, the right level, and the operation task message to obtain a verification message, wherein the verification message is transmitted to the electronic apparatus;

(2) performing the verification pattern calculation by the authorization key, the right token, the right level, and the operation task message to obtain a verification message, with the original authorized operation message further comprising the verification message, and the verification message comprised in the original authorized operation message being transmitted to the electronic apparatus, and (3) performing the verification pattern calculation by the authorization key, the right token, and the authorized operation message to obtain a verification message, wherein the verification message is transmitted to the electronic apparatus.

Furthermore, in the aforesaid mechanism of certain embodiments of the present invention, the electronic apparatus and the delegation management method thereof may firstly generate a right token in the same way as the major management apparatus and the delegation management method thereof. Specifically, the electronic apparatus and the delegation management method thereof may generate a right token by the right verification message (and even an additional right calculation auxiliary message), the right level, and a hash function. Then, the electronic apparatus and the delegation management method thereof perform a verification procedure in a way corresponding to the authorized management apparatus; that is, the electronic apparatus and the delegation management method thereof may perform the verification procedure in one of the following three different ways.

The first way adopted by the electronic apparatus and the delegation management method thereof is to perform the verification pattern calculation by the authorization key, the right token, the right level, and the operation task message to obtain another verification message and then determine whether the calculated verification message is the same as the received verification message. If the calculated verification message is the same as the received verification message, the electronic apparatus will execute the operation. In case the mechanism of the present invention adopts an access right message, then the electronic apparatus and the delegation management method thereof will further determine whether the right level and the operation task message conform to a rule of the access right message after determining that the calculated verification message is the same as the received verification message. The operation will be executed after determining that the right level and the operation task message conform to the rule of the access right message.

The second way adopted by the electronic apparatus and the delegation management method thereof is to perform the verification pattern calculation by the authorization key, the right token, the right level, and the operation task message to obtain another verification message and then determine whether the calculated verification message is the same as the received verification message (comprised in the original authorized operation message). If the calculated verification message is the same as the received verification message, the electronic apparatus will execute the operation. In case the mechanism of the present invention adopts an access right message, the electronic apparatus and the delegation management method thereof will further determine whether the right level and the operation task message conform to a rule of the access right message after determining that the calculated verification message is the same as the received verification message. The operation will be executed after determining that the right level and the operation task message conform to the rule of the access right message.

The third way adopted by the electronic apparatus and the delegation management method thereof is to perform the verification pattern calculation by the authorization key, the right token, and the authorized operation message to obtain another verification message and then determine whether the calculated verification message is the same as the received verification message. If the calculated verification message is the same as the received verification message, the electronic apparatus will execute the operation. In case the mechanism of the present invention adopts an access right message, the electronic apparatus and the delegation management method thereof will further determine whether the right level and the operation task message conform to a rule of the access right message after determining that the calculated verification message is the same as the received verification message. The operation will be executed after determining that the right level and the operation task message conform to the rule of the access right message.

Through the aforesaid mechanism, the major management apparatus of certain embodiments of the present invention can flexibly assign different right levels to the authorized management apparatus according to the needs of practical applications. After being authorized, the authorized management apparatus can generate access request message as need and manage/access the electronic apparatus according to the assigned right levels. The electronic apparatus can also accurately control and execute the management/access operations of the authorized management apparatus according to the right levels. Therefore, the present invention can solve the problems with the prior art.

The detailed technology and preferred embodiments implemented for the subject invention are described in the following paragraphs accompanying the appended drawings for people skilled in this field to well appreciate the features of the claimed invention. It is understood that the features mentioned hereinbefore and those to be commented on hereinafter may be used not only in the specified combinations, but also in other combinations or in isolation, without departing from the scope of the present invention.

DETAILED DESCRIPTION

In the following descriptions, a major management apparatus, an authorized management apparatus, an electronic apparatus for delegation management and delegation management methods thereof according to the present invention will be explained with reference to example embodiments thereof. However, these example embodiments are not intended to limit the present invention to any specific examples, embodiments, environments, applications, or implementations described in these embodiments. Therefore, description of these embodiments is only for purpose of illustration rather than to limit the present invention. It shall be appreciated that, in the following embodiments and the attached drawings, elements not directly related to the present invention are omitted from depiction.

Figure 1A:
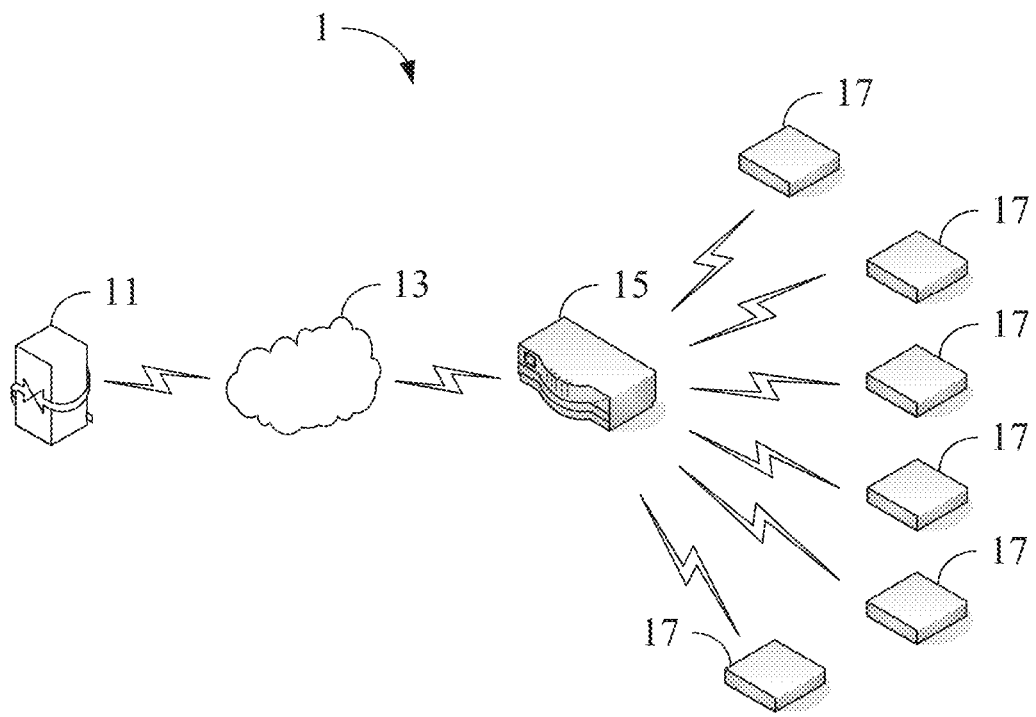
FIG. 1A depicts a schematic architecture of a conventional network system.
Figure 1B:
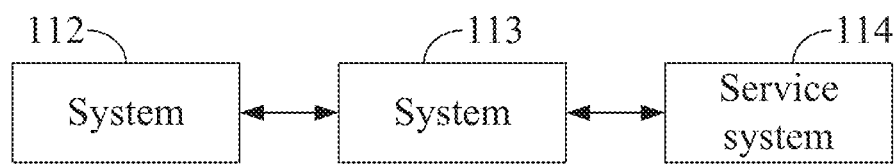
FIG. 1B depicts a user-based delegation mechanism of the prior art.
Figure 2:
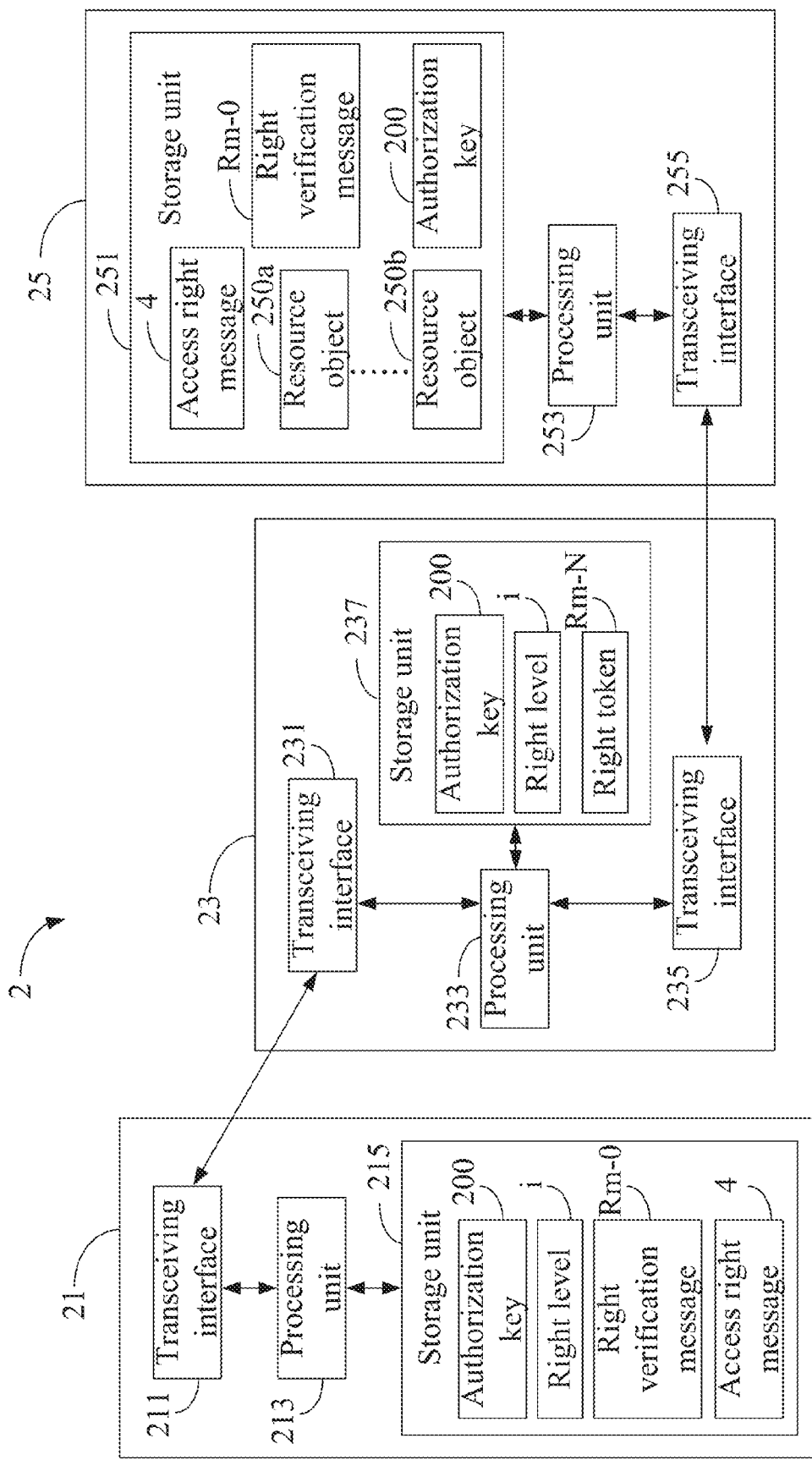
FIG. 2 depicts a schematic view of a network system 2 according to a first embodiment.
Figures 3, 4:
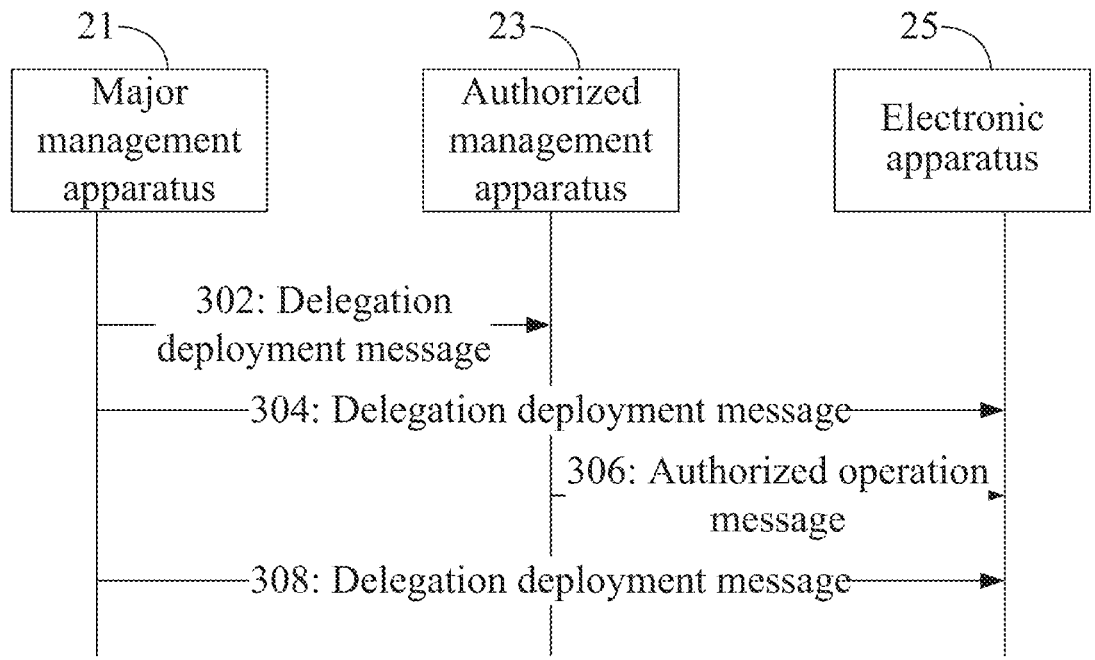
FIG. 3 depicts a schematic view of signal transmissions according to the first embodiment.
FIG. 4 depicts a schematic view of an access right message 4.

FIG. 2 depicts a schematic view of a network system 2 according to a first embodiment, while FIG. 3 depicts a schematic view of signal transmissions according to the first embodiment. The network system 2 comprises a major management apparatus 21, an authorized management apparatus 23 and an electronic apparatus 25 for delegation management.

The major management apparatus 21 comprises a transceiving interface 211, a processing unit 213, and a storage unit 215, wherein the processing unit 213 is electrically connected to the transceiving interface 211 and the storage unit 215. The authorized management apparatus 23 comprises two transceiving interfaces 231, 235, a processing unit 233, and a storage unit 237, wherein the processing unit 233 is electrically connected to the transceiving interfaces 231, 235 and the storage unit 237. The electronic apparatus 25 comprises a storage unit 251, a processing unit 253, and a transceiving interface 255, wherein the processing unit 253 is electrically connected to the storage unit 251 and the transceiving interface 255.

Each of the transceiving interfaces 211, 231, 235, 255 may be any one of various transceiving interfaces that are well known to those of ordinary skill in the art. Each of the processing units 213, 233, 253 may be any one of various processors, central processing units, microprocessors, or other calculating apparatuses that are well known to those of ordinary skill in the art. Each of the storage units 215, 237, 251 may be any one of various built-in memories or other storage media that have the same function and can readily occur to those of ordinary skill in the art.

At an initial stage, the storage unit 251 of the electronic apparatus 25 stores a plurality of resource objects $250a, \ldots, 250b$. each of which may be a datum, a service function, or an apparatus component (e.g., a switch). For example, in this embodiment, the resource object $250a$ is a service function and the resource object $250b$ is a datum. The storage unit 215 of the major management apparatus 21 stores an access right message 4 and a schematic view of the content of the access right message 4 is depicted in FIG. 4. The access right message 4 records which kind of right has been delegated by the major management apparatus 21 to the authorized management apparatus 23; that is, how the authorized management apparatus 23 manages the electronic apparatus 25 when being assigned with different right levels i can be known from the access right message 4.

As shown in FIG. 4, the access right message 4 records the operation codes Op-1, Op-2, Op-4, Op-5, Op-6 that corresponds to different object codes OB-1, ..., OB-K at different right levels i. Each of the object codes OB-1, ..., OB-K corresponds to a resource object. When the resource object corresponding to an object code is a datum, the corresponding operation code may correspond to data reading, data writing, data updating, data deleting, or some other operation related to the data object. When the resource object corresponding to an object code is a service function, the corresponding operation code may correspond to execution, suspension, resuming, termination, or some other operation related to the function object. When the resource object corresponding to an object code is an apparatus component, the corresponding operation code may correspond to turn-on, turn-off, or some other operation related to the apparatus.

For example, in this embodiment, the object codes OB-1, OB-K correspond to the resource objects $250a$. $250b$ respectively. As described above, the resource object $250a$ is a service function and the resource object $250b$ is a datum. Further, the operation codes Op-1, Op-2 correspond to execution and termination respectively and the operation codes Op-4, Op-5, Op-6 correspond to data reading, data writing, and data updating respectively.

At a deployment stage of the delegation, the processing unit 213 of the major management apparatus 21 generates a delegation deployment message 302, which comprises an authorization key 200, a right level i, and a right token Rm-N. Furthermore, the processing unit 213 generates a delegation deployment message 304, which comprises the authorization key 200 and a right verification message Rm-0. The delegation deployment message 304 may further comprise the access right message 4. The major management apparatus 21 can store the authorization key 200, the right level i, and the right verification message Rm-0 into the storage unit 215. Thereafter, the transceiving interface 211 of the major management apparatus 21 transmits the delegation deployment messages 302, 304 to the authorized management apparatus 23 and the electronic apparatus 25 respectively.

It shall be appreciated that the right level i, the right verification message Rm-0, and the right token Rm-N are correlated with each other. This embodiment provides two ways of generating the right token by the right level i and the right verification message Rm-0, which can be used alternatively.

Figure 5A:
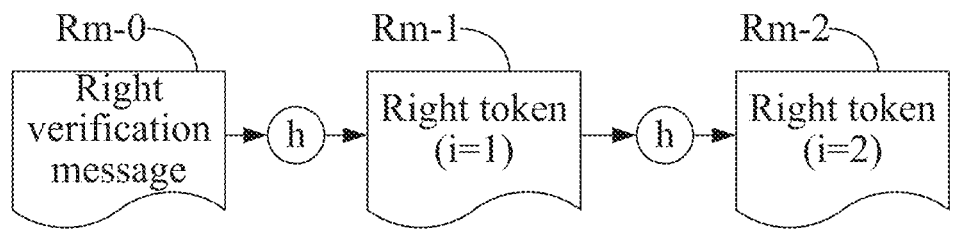
FIG. 5A depicts a schematic view illustrating relationships between a right verification message Rm-0, right levels, and right tokens Rm-1, Rm-2.

Please refer to FIG. 5A for the first way of generating the right token. The major management apparatus 21 determines the degree of the right level i to be assigned to the authorized management apparatus 23. The processing unit 213 then generates the right token Rm-N by the right verification message Rm-0, the right level i, and a hash function. The aforesaid hash function may be SHA-1, MD5, or some other hash function algorithm having a similar function. Specifically, the right level i is a positive integer, the processing unit 213 generates the right token Rm-N by executing a predetermined times of the hash function on the right verification message Rm-0, and the predetermined times is equal to the right level i.

For example, if the right level i is 1, the processing unit 213 will generate the right token Rm-1 by executing a hash function h once on the right verification message Rm-O; if the right level is 2, the processing unit 213 will generate the right token Rm-2 by executing the hash function operation h twice on the right verification message Rm-0; and so on. Depending on the degree of the right level i, the right token Rm-N may be the right token Rm-1, the right token Rm-2, or a right token generated by executing the hash function h for some other number of times. The hash function h is irreversible. Therefore, in this embodiment, the smaller the right level i is, the larger the right scope delegated by the major management apparatus 21 to the authorized management apparatus 23 will be.

Figure 5B:
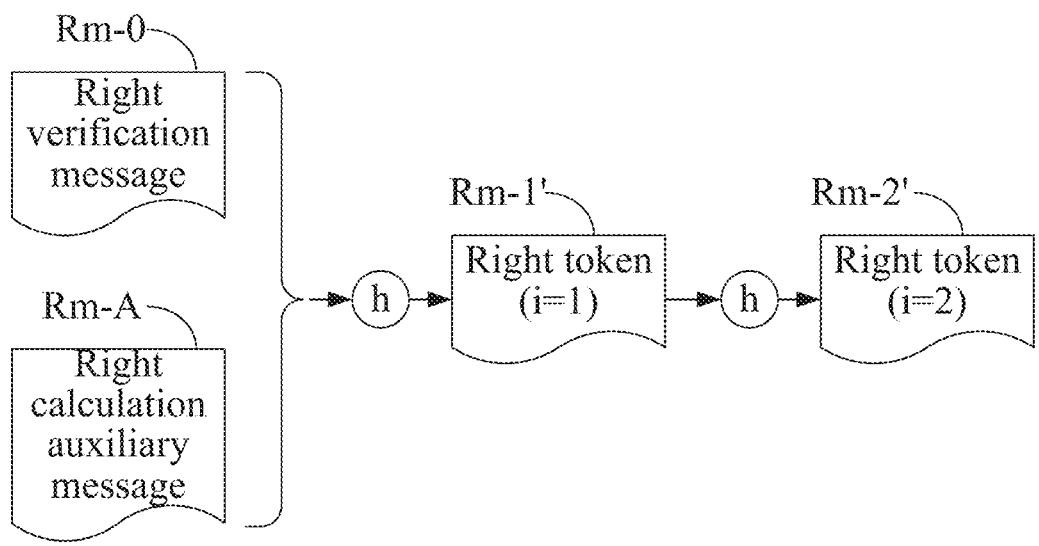
FIG. 5B depicts a schematic view illustrating relationships between the right verification message Rm-0, a right calculation auxiliary message, right levels, and right tokens Rm-1', Rm-2'.

Please refer to FIG. 5B for the second way of generating the right token. The major management apparatus 21 determines the degree of the right levels i to be assigned to the authorized management apparatus 23. Then, the processing unit 213 generates the right token Rm-N by the right verification message Rm-0, a right calculation auxiliary message Rm-A, the right level i, and the hash function h. The right calculation auxiliary message Rm-A comprises the access right message 4 and/or a device code related to the electronic apparatus 25 (e.g., an address of a hardware network interface card of the electronic apparatus 25, a serial number of a product, other information capable of uniquely identifying the electronic apparatus 25, or the like). When the device code related to the electronic apparatus 25 is used as the right calculation auxiliary message Rm-A, the major management apparatus 21 must know this information. The major management apparatus 21 can store the device code related to the electronic apparatus 25 into the storage unit 215.

Before calculating the right token, the processing unit 213 integrates the right verification message Rm-0 and the right calculation auxiliary message Rm-A together, e.g., through concatenation. Thereafter, if the right level i is 1, the processing unit 213 will generate the right token Rm-1' with the right level of 1 by executing the hash function h once on the integrated right verification message Rm-O and the right calculation auxiliary message Rm-A; if the right level i is 2, the processing unit 213 will generate the right token Rm-2' with the right level of 2 by executing the hash function h twice on the integrated right verification message Rm-0 and the right calculation auxiliary message Rm-A; and so on.

If the right token is generated by both the right verification message Rm-0 and the right calculation auxiliary message Rm-A, more precise delegation management can be achieved. In other words, it is more clearly specified that the right scope of the right level i is the right scope defined by the access right message 4 and/or is only limited to use in an electronic apparatus with a specific device code (by incorporating the right calculation auxiliary message Rm-A to calculate the right token).

The delegation deployment message 302 is received by the transceiving interface 231 of the authorized management apparatus 23. The authorization key 200, the right level i, and the right token Rm-N comprised in the delegation deployment message 302 are stored into the storage unit 237. On the other hand, the delegation deployment message 304 is received by the transceiving interface 255 of the electronic apparatus 25 via the authorized management apparatus 23. The authorization key 200 and the right verification message Rm-0 comprised in the delegation deployment message 304 are stored into the storage unit 251. If the delegation deployment message 304 further comprises the access right message 4, the access right message 4 is also stored into the storage unit 251. At this point, the right of managing the electronic apparatus 25 has been delegated by the major management apparatus 21 to the authorized management apparatus 23.

Thereafter, when the authorized management apparatus 23 is to manage the electronic apparatus 25, the processing unit 233 performs a verification pattern calculation by the authorization key 200, the right token Rm-N, the right level i, and an operation task message. The aforesaid operation task message may comprise an object code (i.e., an object to be managed) and an operation code (i.e., an operation to be executed on the object). The aforesaid verification pattern calculation may be any kind of message authentication code (MAC) calculations such as the hash-based message authentication code (HMAC) calculation and the cipher block chaining message authentication code (CBC-MAC) calculation. Furthermore, the processing unit 233 encrypts an original authorized operation message into an authorized operation message 306 by the authorization key 200.

Figure 6A:
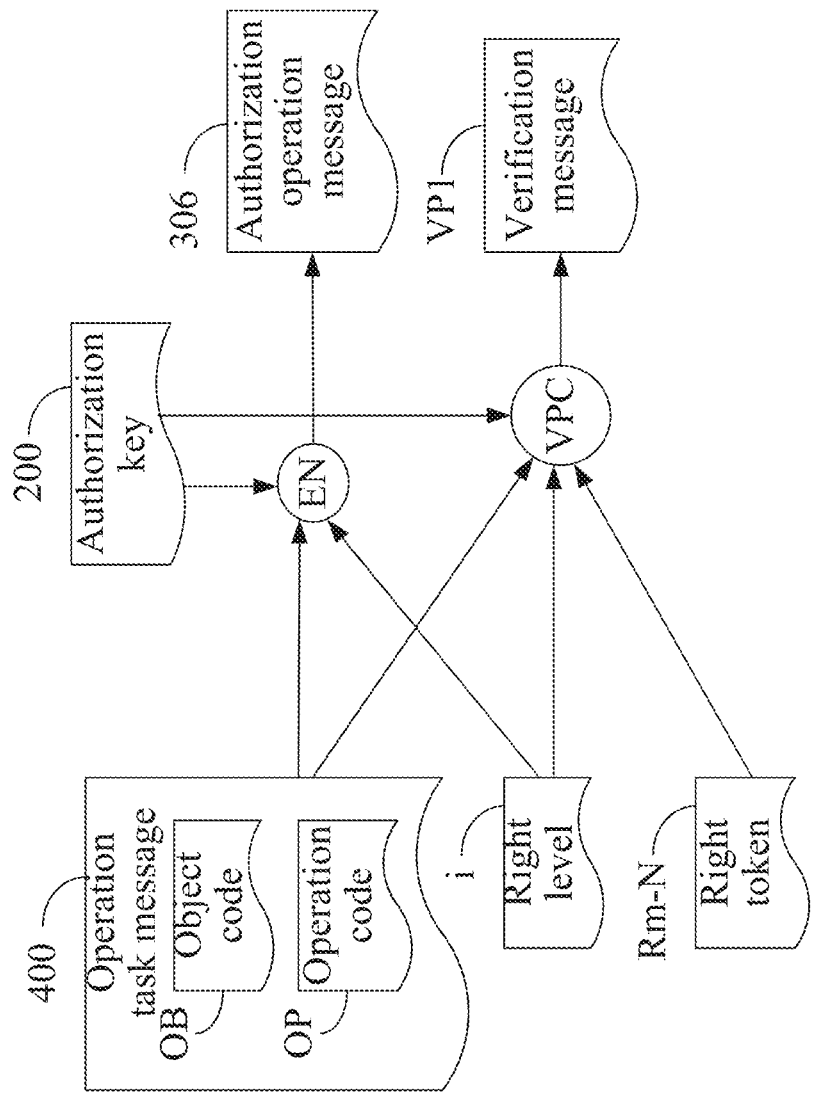
FIG. 6A depicts a schematic view of a verification procedure performed by an authorized management apparatus according to the first embodiment.

Next, the details of the verification pattern calculation performed by the authorized management apparatus 23 and the generation of the authorized operation message 306 in this embodiment will be described with reference to FIG. 6A. Specifically, the processing unit 233 performs the verification pattern calculation VPC by the right token Rm-N, the right level i, the operation task message 400 (comprising an object code OB and an operation code OP), and the authorization key 200 to obtain a verification message VP1. Furthermore, the processing unit 233 views the right level i and the operation task message 400 as the original authorized operation message and generates the authorized operation message 306 by executing an encrypting operation EN on the original authorized operation message by the authorization key 200.

The transceiving interface 235 of the authorized management apparatus 23 transmits the verification message VP1 and the authorized operation message 306 to the electronic apparatus 25, while the transceiving interface 255 of the electronic apparatus 25 receives the verification message VP1 and the authorized operation message 306. Next, the processing unit 253 of the electronic apparatus 25 decrypts the authorized operation message 306 into the original authorized operation message by the authorization key 200 and thus obtains the operation task message 400 and the right level i. Then, the processing unit 253 performs a verification procedure by the authorization key 200, the right verification message Rm-0, the right level i, and the operation task message 400.

Next, the details of how the electronic apparatus 25 processes the authorized operation message 306 and the verification procedure performed by the electronic apparatus 25 in this embodiment will be described with reference to FIG. 6B. Specifically, the electronic apparatus 25 executes a decrypting operation DE on the authorized operation message 306 by the authorization key 200 so as to generate the original authorized operation message and thus obtains the right level i and the operation task message 400.

Following that, the verification procedure performed by the electronic apparatus 25 will be described. The processing unit 253 firstly generates a right token Rm-N'. If the major management apparatus 21 previously generates the right token Rm-N for the authorized management apparatus 23 by the way shown in FIG. 5A, the processing unit 253 of the electronic apparatus 25 will use the right verification message Rm-0, the right level i, and the same hash function to generate the right token Rm-N'. Specifically, the right level i is a positive integer, the processing unit 253 generates the right token Rm-N' by executing a predetermined times of the hash function h on the right verification message Rm-0, and the predetermined times is equal to the right level i.

If the major management apparatus 21 previously generates the right token Rm-N by the way shown in FIG. 5B, then the processing unit 253 of the electronic apparatus 25 will generate the right token Rm-N' by the right verification message Rm-0, the right calculation auxiliary message Rm-A, the right level i, and the same hash function. Specifically, the processing unit 253 generates the right token Rm-N' by executing a predetermined time of the hash function h on the right verification message Rm-0 and the right calculation auxiliary message Rm-A and the predetermined times is equal to the right level i.

Then, the processing unit 253 obtains a verification message VP2 by using the authorization key 200, the right token Rm-N', the right level i and the operation task message 400 to execute the same verification pattern calculation VPC. Subsequently, the processing unit 253 executes a comparison operation CMP on the verification message VP1 and the verification message VP2, i.e., determines whether the verification message VP1 is the same as the verification message VP2. If the verification message VP1 is different from the verification message VP2 (i.e., meaning that the authorized management apparatus 23 does not pass the verification procedure), then the electronic apparatus 25 will not execute any operation according to the instructions of the authorized management apparatus 23. If the verification message VP1 is the same as the verification message VP2, then the processing unit 253 will inquire the access right message 4 according to the right level i and the operation task message 400 in order to determine whether to execute an operation according to the right level i and the operation task message 400. If the right level i and the operation task message 400 conform to a rule of the access right message 4, then the processing unit 253 will execute the corresponding operation according to the right level i and the operation task message 400.

As an example, it is assumed that the authorized management apparatus 23 passes the verification procedure, the object code OB and the operation code OP comprised in the operation task message 400 are the object code OB-1 and the operation code Op-1 respectively, and the right level i is 1. The processing unit 253 inquires the access right message 4 and determines that the object code OB-1 corresponds to the operation code Op-1 when the right level i is 1, so the processing unit 253 then executes on the resource object 250a the operation represented by the operation code Op-1.

As another example, it is assumed that the authorized management apparatus 23 passes the verification procedure, the object code OB and the operation code OP comprised in the operation task message 400 are the object code OB-K and the operation code Op-6 respectively, and the right level i is 2. The processing unit 253 inquires the access right message 4 and determines that the object code OB-K does not correspond to the operation code Op-6 when the right level i is 1, so the processing unit 253 will not execute on the resource object 250b corresponding to the object code OB-K the operation (i.e., data updating) represented by the operation code Op-6.

It shall be appreciated that, the authorization key used during the encrypting operation EN and the decrypting operation DE may be different from the authorization key used during the verification pattern calculation in other implementations. In these implementations, the delegation deployment messages 302, 304 have to comprise two authorization keys individually.

When the authorized management apparatus 23 intends to manage the same object or other object in the electronic apparatus 25 subsequently, the authorized management apparatus 23 simply needs to generate the authorized operation message 306 again. Depending on which object is to be managed and which operation is to be executed, the authorized operation message 306 generated subsequently may carry different object codes and operation codes.

Furthermore, if the major management apparatus 21 intends to increase the right level i assigned to the authorized management apparatus 23 (i.e., decrease the value of the right level i, e.g., change the value of the right level i from 2 to 1), the major management apparatus 21 has to generate an additional delegation deployment message that comprises the updated right level i and the updated right token. The major management apparatus 21 transmits the new delegation deployment message to the authorized management apparatus 23. After receiving the new delegation deployment message, the authorized management apparatus 23 obtains the updated right level i and the updated right token.

If the major management apparatus 21 intends to decrease the right level i assigned to the authorized management apparatus 23 (e.g., change the value of the right level i from 1 to 2), then the major management apparatus 21 has to generate a new right token in the way shown in FIG 5A or FIG. 5B by a new right verification message. Then, the major management apparatus 21 generates an additional delegation deployment message for the authorized management apparatus 23, wherein the additional delegation deployment message comprises the updated right level i and the updated right token Rm-N. Furthermore, the major management apparatus 21 also generates an additional delegation deployment message for the electronic apparatus 25, wherein the additional delegation deployment message comprises the updated right verification message Rm-0. After the new delegation deployment messages are received by the authorized management apparatus 23 and the electronic apparatus 25, the decreasing operation of the right level is completed.

Moreover, this embodiment also provides a delegation revoking mechanism. If the major management apparatus 21 intends to suspend delegating the authorized management apparatus 23 to manage the resource objects (e.g., the resource objects 250a, . . . , 250b) stored in the electronic apparatus 25, the transceiving interface 211 of the major management apparatus 21 will transmit another delegation deployment message 308 to the electronic apparatus 25. An authorization key comprised in the delegation deployment message 308 is different from the authorization key comprised in the delegation deployment message 304. The electronic apparatus 25 will change to use the new authorization key after receiving the delegation deployment message 308. Therefore, the authorized management apparatus 23 cannot manage and operate the objects stored in the electronic apparatus 25 any longer because the authorized management apparatus 23 and the electronic apparatus 25 have different authorization keys.

It shall be appreciated that, in other implementations, both the major management apparatus 21 and the authorized management apparatus 23 are stored with a first device key and the messages/signals transmitted between the major management apparatus 21 and the authorized management apparatus 23 are all encrypted by the first device key. Besides, both the major management apparatus 21 and the electronic apparatus 25 are stored with a second device key and the messages/signals transmitted between the major management apparatus 21 and the electronic apparatus 25 are all encrypted by the second device key.

According to the above descriptions, in the first embodiment, the major management apparatus 21 transmits the delegation deployment messages 302, 304 comprising the authorization key 200 to the authorized management apparatus 23 and the electronic apparatus 25 respectively so that transmission of messages/signals between the authorized management apparatus 23 and the electronic apparatus 25 can be protected by the authorization key 200. Then, the authorized management apparatus 23 can securely transmit the authorized operation message 306 to the electronic apparatus 25 so that the electronic apparatus 25 executes an operation according to the right level i and the operation task message 400 comprised in the authorized operation message 306. In this way, the major management apparatus 21 can delegate the authorized management apparatus 23 to manage the electronic apparatus 25. Besides, through the access right message 4, the major management apparatus 21 can delegate the delegation management to the authorized management apparatus 23 in a finer way, i.e., can further perform different management operation right controls on the objects respectively. Furthermore, by transmitting the new delegation deployment message 308, the delegating operations of managing the electronic apparatus 25 can also be revoked to achieve a flexible management effect.

Next, a second embodiment of the present invention will be described. The second embodiment differs from the first embodiment in the authorized operation message 306 generated by the authorized management apparatus 23, the verification pattern calculation performed by the authorized management apparatus 23, how the electronic apparatus 25 processes the authorized operation message 306, and the verification procedure performed by the electronic apparatus 25. Except the above differences, the second embodiment can execute all the operations described in the first embodiment. Therefore, only the differences between the second embodiment and the first embodiment will be described hereinbelow.

Figure 7A:
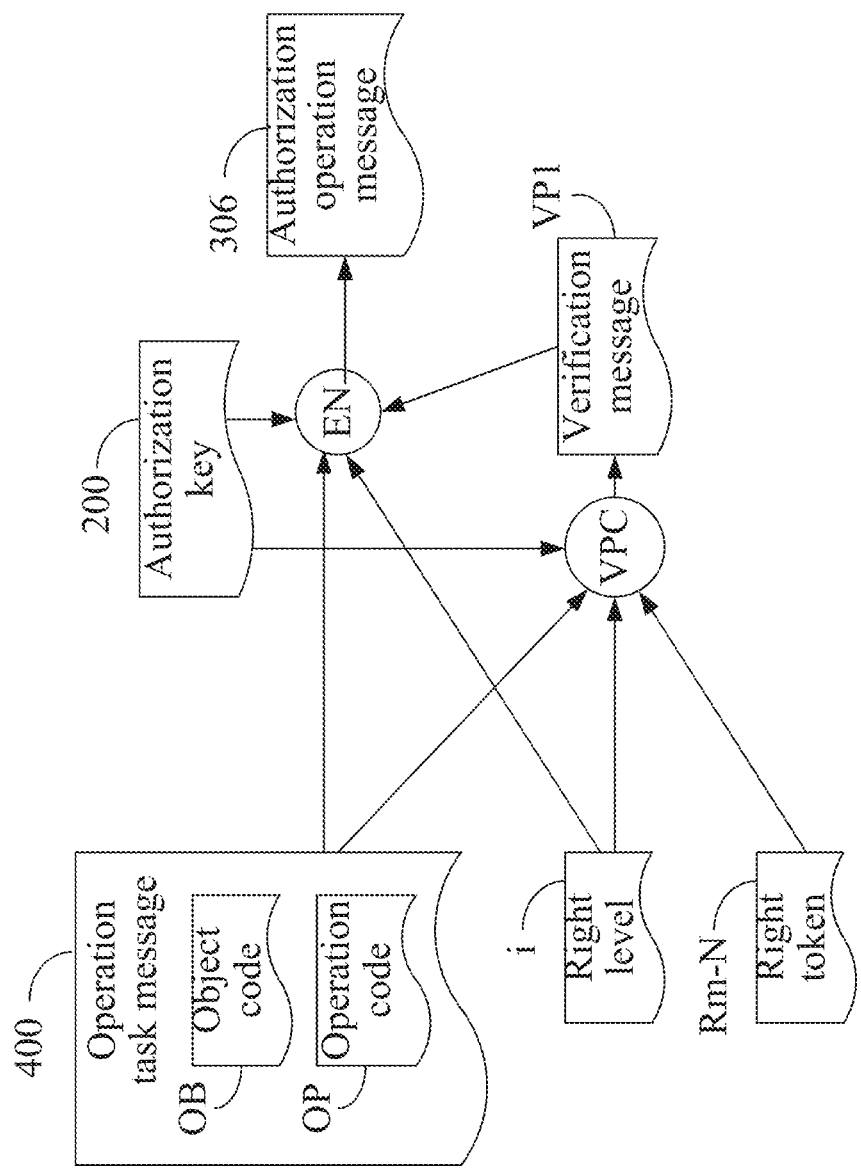
FIG. 7A depicts a schematic view of a verification procedure performed by an authorized management apparatus according to a second embodiment.

Please refer to FIG. 7A for the details of the verification pattern calculation performed by the authorized management apparatus 23 and the generation of the authorized operation message 306 in this embodiment. The processing unit 233 of the authorized management apparatus 23 performs a verification pattern calculation VPC by the authorization key 200, the right token Rm-N, the right level i, and the operation task message 400 to obtain a verification message VP1. Then, the processing unit 233 views the right level i, the operation task message 400, and the verification message VP1 as the original authorized operation message. The processing unit 233 generates the authorized operation message 306 by executing an encrypting operation EN on the original authorized operation message by the authorization key 200 and the transceiving interface 235 transmits the authorized operation message 306 to the electronic apparatus 25.

Figure 7B:
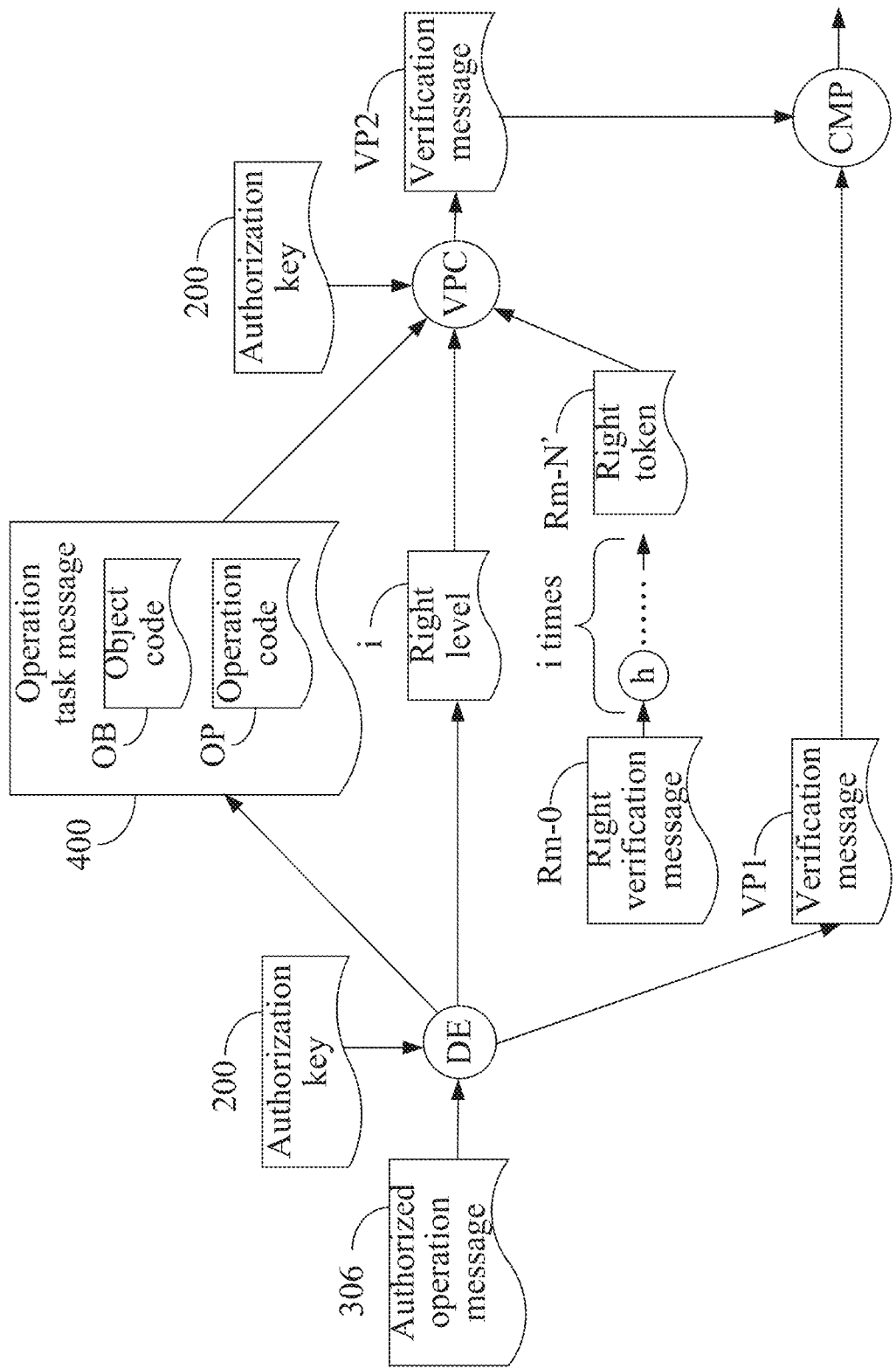
FIG. 7B depicts a schematic view of a verification procedure performed by an electronic apparatus according to the second embodiment.

Please refer to FIG. 7B, which illustrates how the electronic apparatus 25 of this embodiment processes the authorized operation message 306 and performs the verification procedure. After the authorized operation message 306 is received by the transceiving interface 255 of the electronic apparatus 25, the processing unit 253 executes a decrypting operation DE on the authorized operation message 306 by the authorization key 200 to generate the original authorized operation message and thus obtains the right level i, the operation task message 400, and the verification message VP1. Then, the processing unit 253 generates a right token Rm-N' by the right verification message Rm-0, the right level i, and the same hash function. If the major management apparatus 21 previously generates the right token Rm-N by the way shown in FIG. 5B, then the processing unit 253 of the electronic apparatus 25 use the right verification message Rm-0, the right calculation auxiliary message Rm-A, the right level i, and the same hash function to generate the right token Rm-N'. Then, the processing unit 253 obtains a verification message VP2 by using the authorization key 200, the right token Rm-N', the right level i, and the operation task message 400 to execute the same verification pattern calculation VPC.

Likewise, the processing unit 253 executes a comparison operation CMP on the verification message VP1 and the verification message VP2, i.e., determines whether the verification message VP1 is the same as the verification message VP2. If the verification message VP1 is the same as the verification message VP2 (meaning that the authorized management apparatus 23 passes the verification procedure), then the processing unit 253 will inquire the access right message 4 according to the right level i and the operation task message 400 so as to determine whether to execute an operation according to the right level i and the operation task message 400. If the right level i and the operation task message 400 conform to the rule of the access right message 4, then the processing unit 253 will execute the corresponding operation according to the right level i and the operation task message 400. If the verification message VP1 is different from the verification message VP2 (meaning that the authorized management apparatus 23 does not pass the verification procedure), then the electronic apparatus 25 will not execute any operation according to the instructions of the authorized management apparatus 23.

It shall be appreciated that, the authorization key used during the encrypting operation EN/the decrypting operation DE may be different from the authorization key used during the verification pattern calculation in other implementations. In these implementations, the previous delegation deployment messages 302, 304 need to comprise two authorization keys.

In addition to the aforesaid verification procedure, the second embodiment can also execute other operations that can be executed by the first embodiment. As those operations have been addressed in detail in the first embodiment, they are not repeated here.

Next, a third embodiment of the present invention will be described. The third embodiment differs from the first embodiment in the authorized operation message 306 generated by the authorized management apparatus 23, the verification pattern calculation performed by the authorized management apparatus 23, how the electronic apparatus 25 processes the authorized operation message 306, and the verification procedure performed by the electronic apparatus 25. Except the above differences, the third embodiment can execute all the operations described in the first embodiment. Therefore, only the differences between the third embodiment and the first embodiment will be described hereinbelow.

Figure 8A:
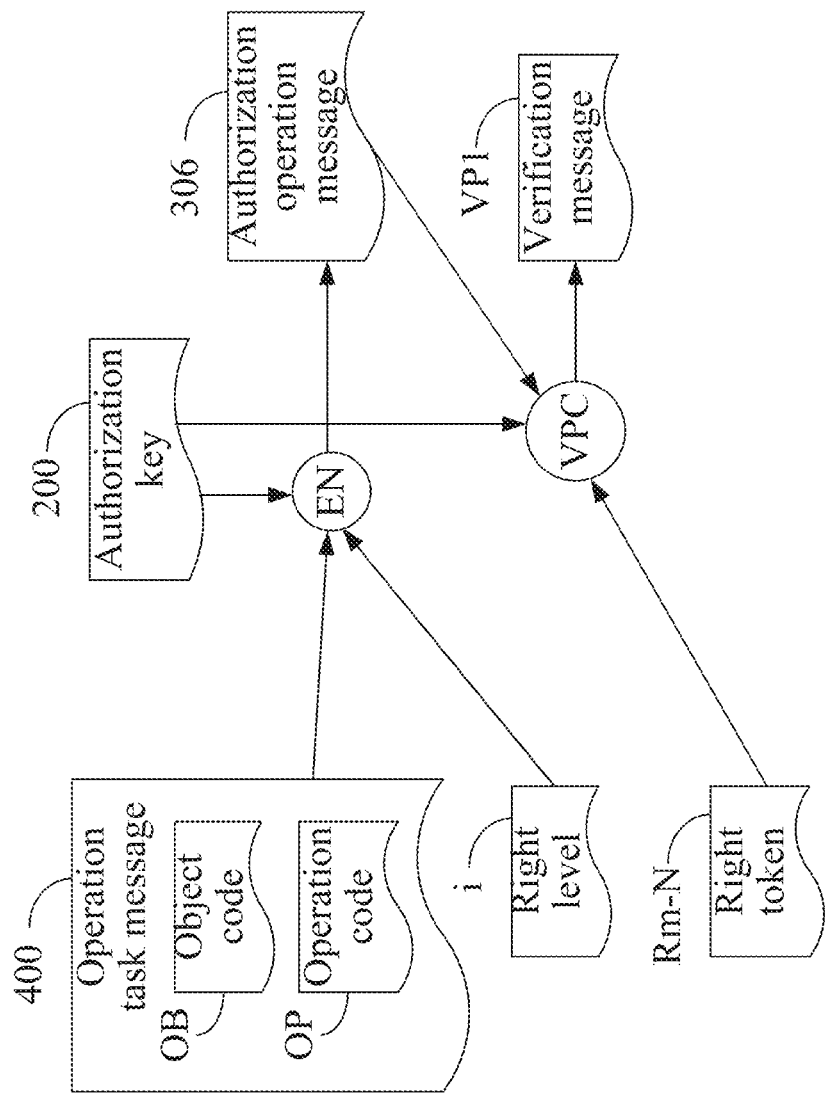
FIG. 8A depicts a schematic view of a verification procedure performed by an authorized management apparatus according to a third embodiment.

Please refer to FIG. 8A for the details about the verification pattern calculation performed by the authorized management apparatus 23 and the processes for generating the authorized operation message 306 in this embodiment. The processing unit 233 views the right level i and the operation task message 400 as the original authorized operation message and executes an encrypting operation EN on the original authorized operation message by the authorization key 200 to generate the authorized operation message 306. Then, the processing unit 233 performs a verification pattern calculation VPC by the authorization key 200, the right token Rm-N, and the authorized operation message 306 to obtain a verification message VP1. The transceiving interface 235 of the authorized management apparatus 23 transmits the authorized operation message 306 and the verification message VP1 to the electronic apparatus 25, while the transceiving interface 255 of the electronic apparatus 25 receives the authorized operation message 306 and the verification message VP1.

Figure 8B:
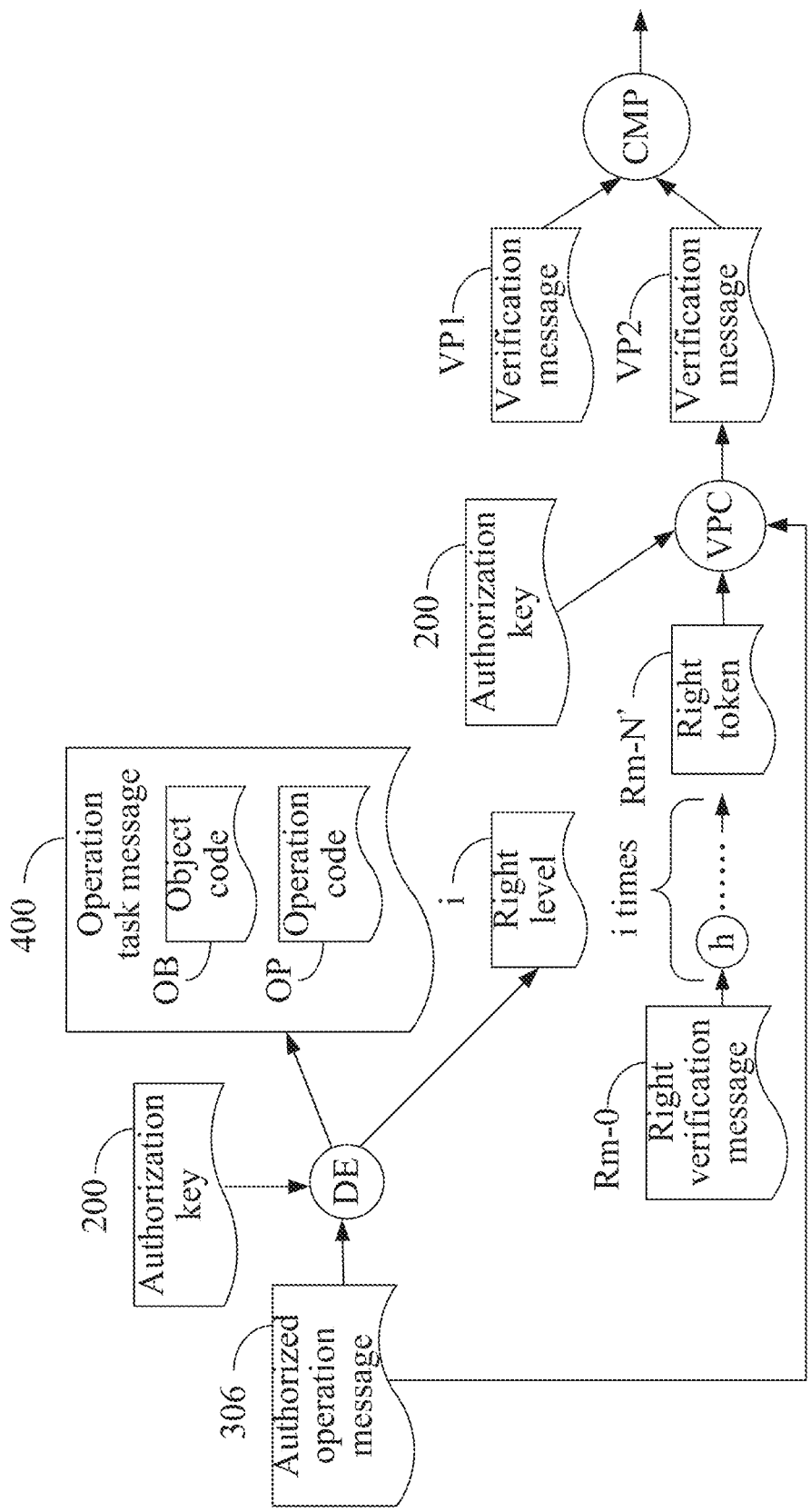
FIG. 8B depicts a schematic view of a verification procedure performed by an electronic apparatus according to the third embodiment.

Please refer to FIG. 8B, which illustrates how the electronic apparatus 25 processes the authorized operation message 306 and performs the verification procedure in this embodiment. The electronic apparatus 25 executes a decrypting operation DE on the authorized operation message 306 by the authorization key 200 to generate the original authorized operation message and thus obtains the right level i and the operation task message 400. Then, the processing unit 253 uses the right verification message Rm-0, the right level i, and the same hash function to generate a right token Rm-N'. If the major management apparatus 21 previously generates the right token Rm-N in the way shown in FIG. 5B, then the processing unit 253 of the electronic apparatus 25 will use the right verification message Rm-0, the right calculation auxiliary message Rm-A, the right level i, and the same hash function to generate the right token Rm-N'. Then, the processing unit 253 obtains a verification message VP2 by using the right token Rm-N' and the authorized operation message 306 to execute the same verification pattern calculation VPC.

Likewise, the processing unit 253 executes a comparison operation CMP on the verification message VP1 and the verification message VP2, i.e., determines whether the verification message VP1 is the same as the verification message VP2. If the verification message VP1 is the same as the verification message VP2 (meaning that the authorized management apparatus 23 passes the verification procedure), then the processing unit 253 will inquire the access right message 4 according to the right level i and the operation task message 400 so as to determine whether to execute an operation according to the right level i and the operation task message 400. If the right level i and the operation task message 400 conform to a rule of the access right message 4, then the processing unit 253 will execute the corresponding operation according to the right level i and the operation task message 400. If the verification message VP1 is different from the verification message VP2 (meaning that the authorized management apparatus 23 does not pass the verification procedure), then the electronic apparatus 25 will not execute any operation according to the instructions of the authorized management apparatus 23.

It shall be appreciated that, the authorization key used during the encrypting operation EN/the decrypting operation DE may be different from the authorization key used during the verification pattern calculation in other implementations.

In these implementations, the delegation deployment messages 302, 304 need to comprise two authorization keys.

In addition to the aforesaid verification procedure, the third embodiment can also execute other operations that can be executed by the first embodiment. As those operations have been addressed in detail in the first embodiment, they are not repeated here.

Figure 9A:
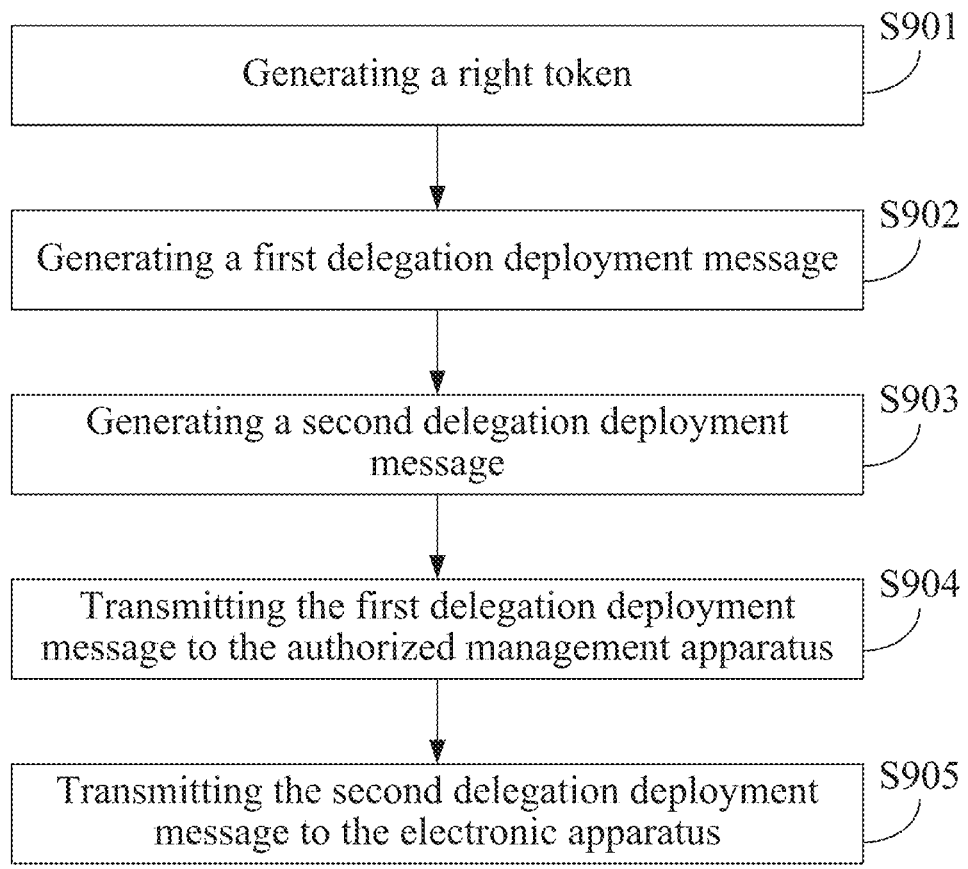
FIG. 9A, FIG. 9B and FIG. 9C depict the flowcharts of a delegation management method according to a fourth embodiment.
Figure 9B:
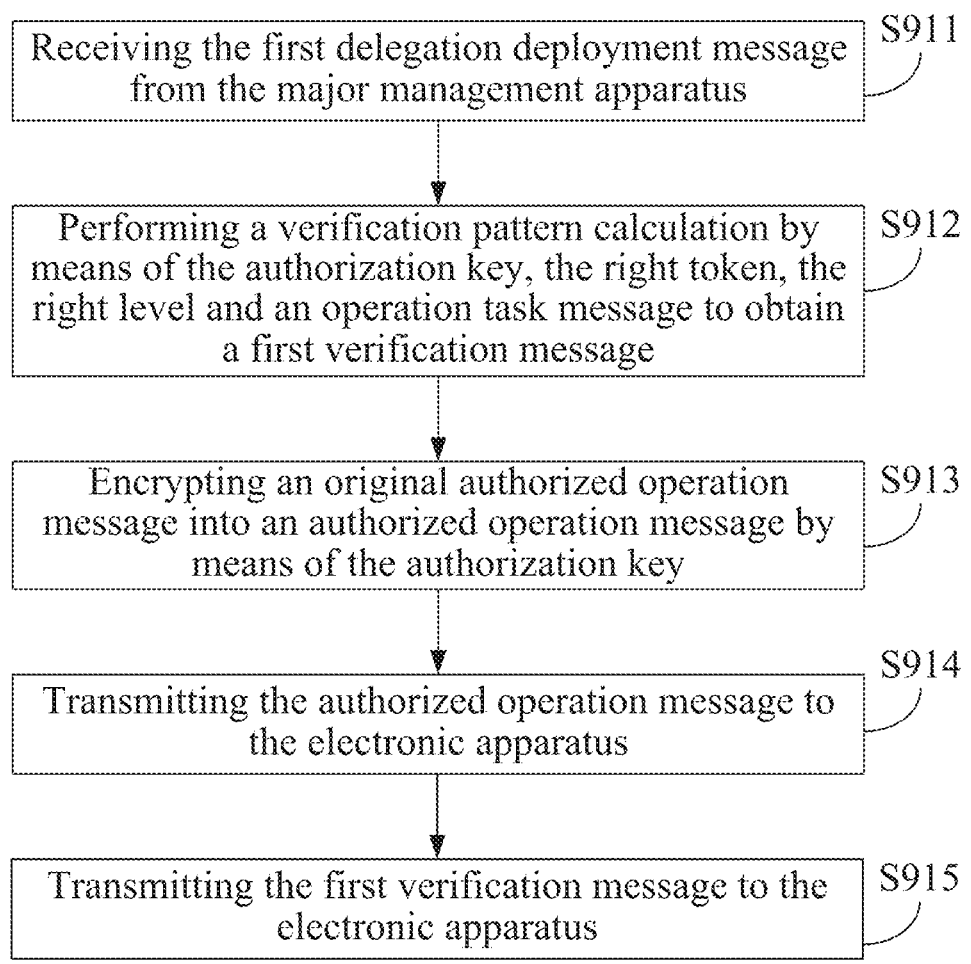
Figure 9C:
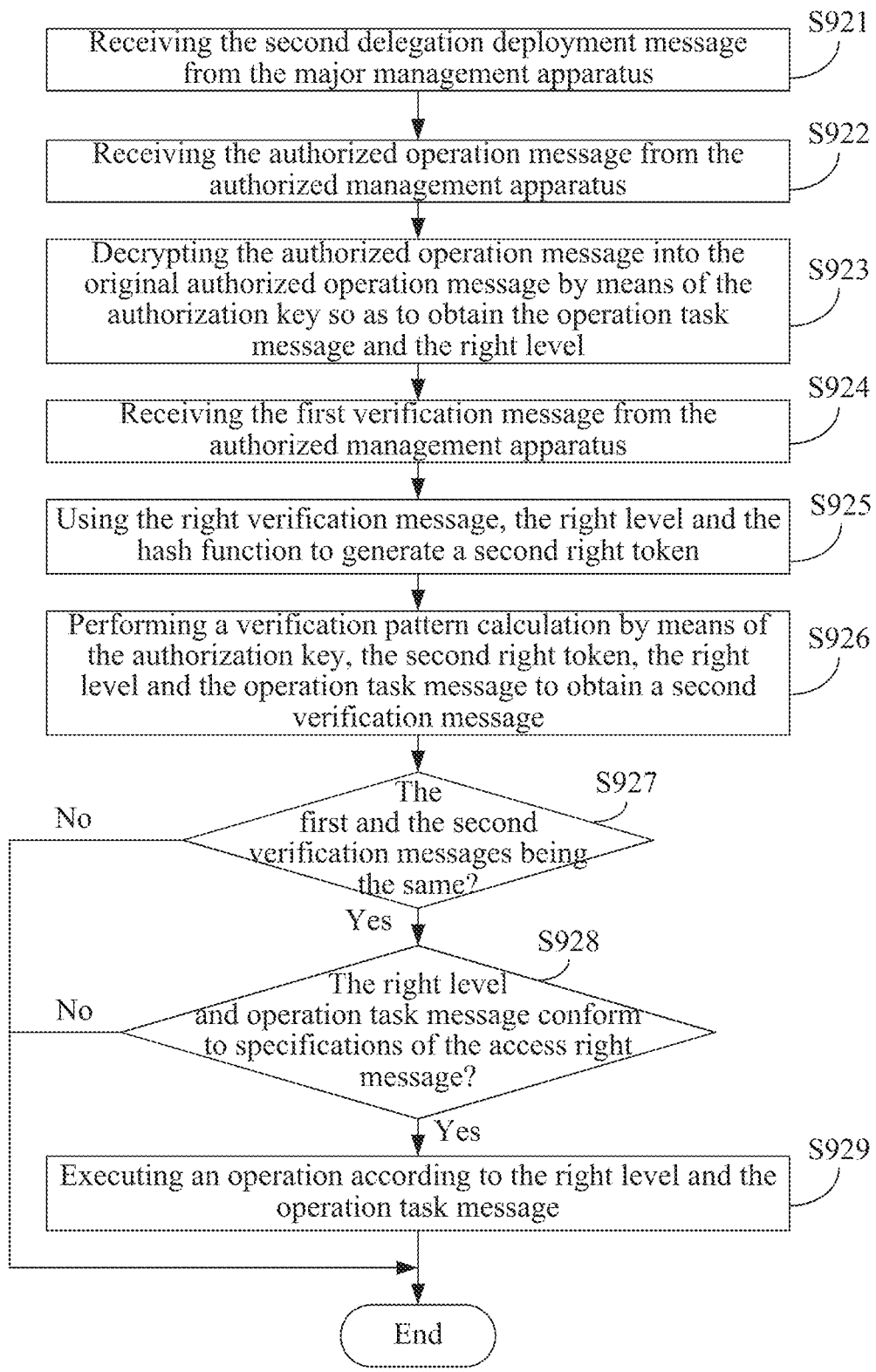

A fourth embodiment of the present invention is a delegation management method, which is suitable for use in a network system comprising a major management apparatus, an authorized management apparatus, and an electronic apparatus. FIG. 9A, FIG. 9B, and FIG. 9C depict the flowcharts of the delegation management methods executed by the major management apparatus, the authorized management apparatus, and the electronic apparatus respectively.

Firstly, the delegation management method executed by the major management apparatus will be described. Step S901 is executed to enable the major management apparatus to generate a right token. If the major management apparatus has generated the right token previously, then the step S901 can be omitted. This embodiment provides two ways of generating the right token, which can be used alternatively.

Hereinbelow, the first way of generating the right token will be described firstly. The step S901 may use a right verification message, a right level, and a hash function to generate the right token. Specifically, the value of the right level is a positive integer, the step S901 may generate the right token by executing a predetermined times of the hash function on the right verification message, and the predetermined times is equal to the right level, as shown in FIG. 5A.

Then, the second way of generating the right token will be described. The step S901 may generate the right token by a right verification message, a right calculation auxiliary message, a right level, and a hash function. The right calculation auxiliary message comprises an access right message and/or a device code associated with the electronic apparatus. Specifically, the value of the right level is a positive integer, the step S901 may generate the right token by executing a predetermined times of the hash function on the right verification message and the right calculation auxiliary message, and the predetermined times is equal to the right level, as shown in FIG. 5B.

Then, step S902 is executed to enable the major management apparatus to generate a first delegation deployment message, which comprises an authorization key, the right level, and the right token. Step S903 is executed to enable the major management apparatus to generate a second delegation deployment message, which comprises the same authorization key and the right verification message. The second delegation deployment message may further comprise the access right message as shown in FIG. 4. It shall be appreciated that the execution orders of the step S902 and the step S903 may be exchanged.

Then, step S904 and step S905 are executed to enable the major management apparatus to transmit the first delegation deployment message to the authorized management apparatus and transmit the second delegation deployment message to the electronic apparatus respectively. It shall be appreciated that the execution orders of the step S904 and the step S905 may be exchanged.

If both the major management apparatus 21 and the authorized management apparatus 23 are stored with a first device key and both the major management apparatus 21 and the electronic apparatus 25 are stored with a second device key in other implementations, then the first delegation deployment message generated in the step S902 is encrypted by the first device key and the second delegation deployment message generated in the step S903 is encrypted by the second device key.

Then, the delegation management method executed by the authorized management apparatus will be described. Step S911 is executed to enable the authorized management apparatus to receive the first delegation deployment message from the major management apparatus and thus obtain the authorization key, the right token, and the right level. Then, step S912 is executed to enable the authorized management apparatus to perform a verification pattern calculation by the authorization key, the right token, the right level, and an operation task message to obtain a first verification message as shown in FIG. 6A. The aforesaid operation task message comprises an object code (i.e., an object in the electronic apparatus 25 to be managed) and an operation code (i.e., an operation to be executed).

Then, step S913 is executed to enable the authorized management apparatus to encrypt an original authorized operation message into an authorized operation message by the authorization key. The original authorized operation message comprises the right level and the operation task message as shown in FIG. 6A. Then, step S914 and step S915 are executed to enable the authorized management apparatus to transmit the authorized operation message and the first verification message to the electronic apparatus respectively. It shall be appreciated that the execution orders of the step S914 and the step S915 may be exchanged or the step S914 and the step S915 may be combined together.

Figure 6B:
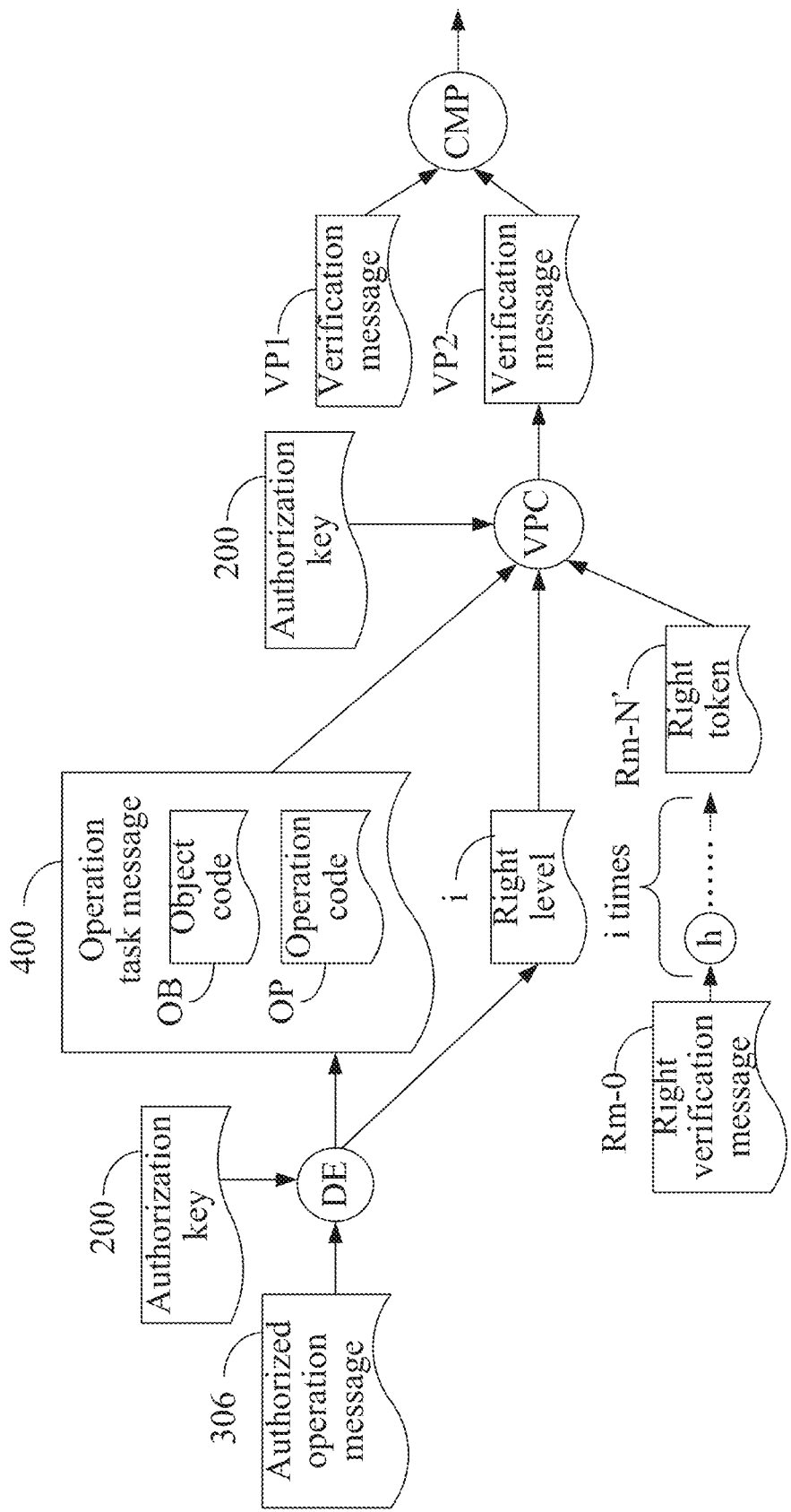
FIG. 6B depicts a schematic view of a verification procedure performed by an electronic apparatus according to the first embodiment.

Referring to FIG. 9C and FIG. 6B together, the delegation management method executed by the electronic apparatus will be described. Step S921 is executed to enable the electronic apparatus to receive the second delegation deployment message from the major management apparatus and thus obtain an authorization key and a right verification message and even further obtain an access right message. Then, step S922 is executed to enable the electronic apparatus to receive the authorized operation message from the authorized management apparatus. Step S923 is executed to enable the electronic apparatus to decrypt the authorized operation message into the original authorized operation message by the authorization key so as to obtain the operation task message and the right level.

Then, step S924 is executed to enable the electronic apparatus to receive the first verification message from the authorized management apparatus. Subsequently, step S925 is executed to enable the electronic apparatus to generate a second right token by the right verification message, the right level, and the hash function. If the step S901 generates the first right token in the way shown in FIG. 5B, then the step S925 generates the second right token by the right verification message, the right calculation auxiliary message, the right level, and the hash function. Step S926 is executed to enable the electronic apparatus to perform the same verification pattern calculation as that in the step S912 by the authorization key, the second right token, the right level, and the operation task message to obtain a second verification message.

Then, step S927 is executed to enable the electronic apparatus to determine whether the first verification message is the same as the second verification message. If it is determined in the step S927 that the first verification message is different from the second verification message, then the operation at this stage is ended. If it is determined in the step S927 that the first verification message is the same as the second verification message, then step S928 is executed. Step S928 is executed to enable the electronic apparatus to determine whether the right level and the operation task message conform to a rule of the access right message. If the determination result of the step S928 is "no", then the operation at this stage is ended. If the result of the step S928 is "yes", then the electronic apparatus executes an operation according to the right level and the operation task message.

In addition to the aforesaid steps, the delegation management method of the fourth embodiment can also execute all the operations and functions set forth in the first embodiment. How the fourth embodiment executes these operations and functions can be readily appreciated by those of ordinary skill in the art based on the explanation of the first embodiment, and thus will not be further described herein.

A fifth embodiment of the present invention is a delegation management method, which is also suitable for use in a network system comprising a major management apparatus, an authorized management apparatus, and an electronic apparatus. The steps executed in the fifth embodiment are similar to those executed in the fourth embodiment, so only the differences between the two embodiments will be detailed hereinbelow.

In this embodiment, the major management apparatus also executes the steps as shown in FIG. 9A, which will not be further described herein.

Figure 10A:
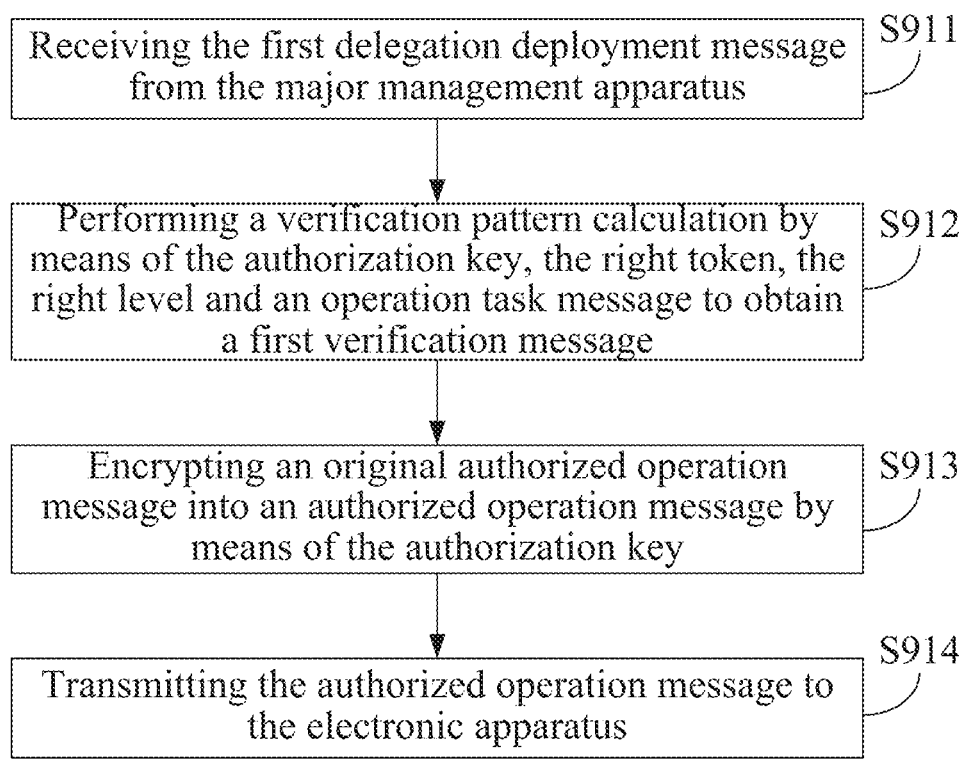
FIG. 10A and FIG. 10B depict the partial flowcharts of a delegation management method according to a fifth embodiment.

FIG. 10A depicts a flowchart of the delegation management method executed by the authorized management apparatus of this embodiment. Similarly, the authorized management apparatus firstly executes the step S911 and the step S912, which have been detailed above and thus will not be further described herein. In the subsequent step S913, the encrypted original authorized operation message further comprises the first verification message generated in the step S912 in addition to the operation task message and the right level. For convenience of understanding, please refer to FIG. 7A together for the operational details of the step S912 and the step S913. Since the first verification message has been comprised in the original authorized operation message which is encrypted into the authorized operation message, only step S914 is executed subsequently to transmit the authorized operation message to the electronic apparatus.

Figure 10B:
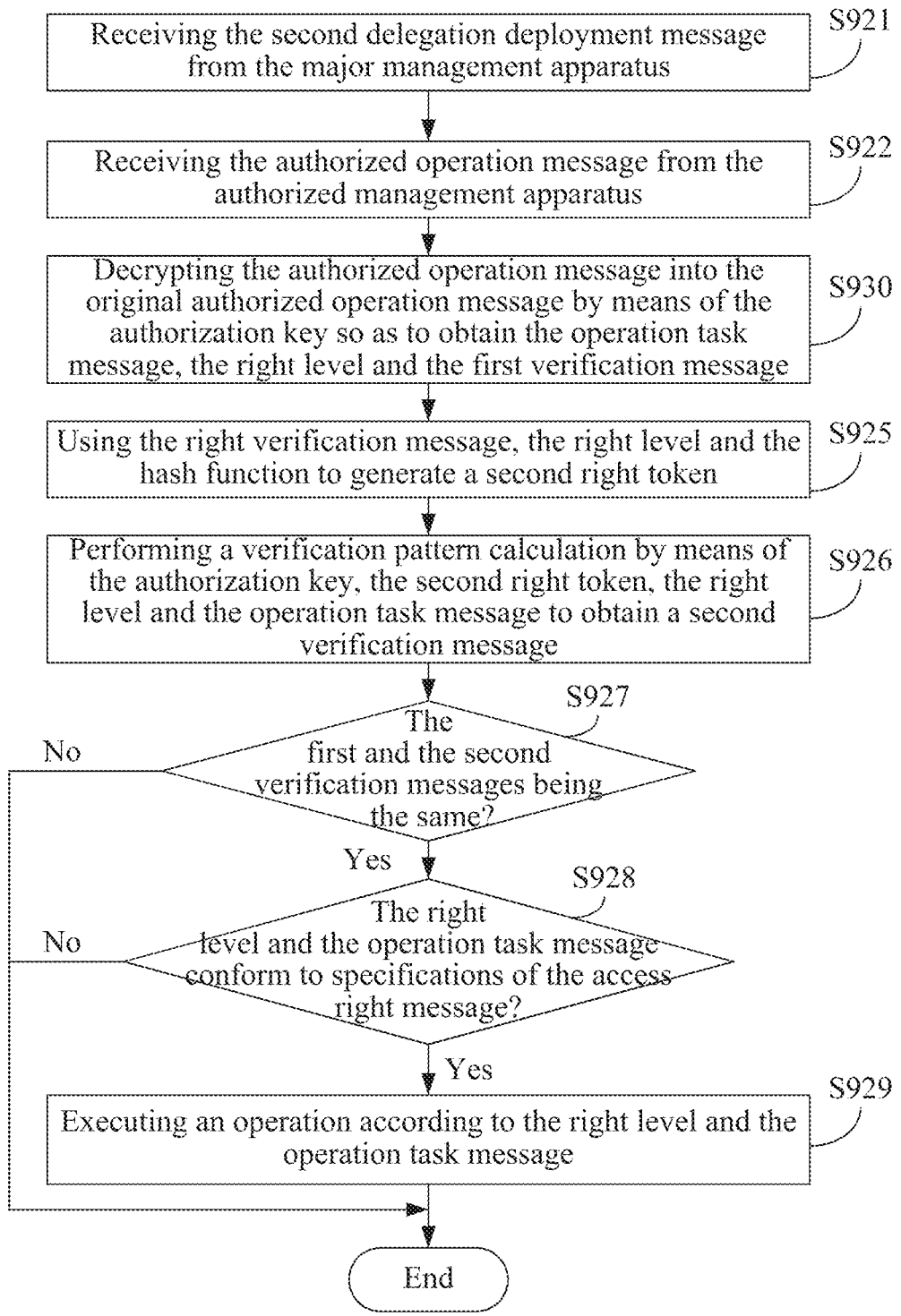

FIG. 10B depicts a flowchart of the delegation management method executed by the electronic apparatus of this embodiment. Please refer to FIG. 7B together for convenience of understanding. In this embodiment, the electronic apparatus firstly executes the step S921 and the step S922, which have been detailed in the previous embodiment and thus will not be further described herein. Then, step S930 is executed to enable the electronic apparatus to decrypt the authorized operation message into the original authorized operation message by the authorization key so as to obtain the operation task message, the right level, and the first verification message.

Then, step S925 is executed to enable the electronic apparatus to generate a second right token by the right verification message, the right level, and the hash function. If the step S901 generates the first right token in the way shown in FIG. 5B, then the step S925 generates the second right token by the right verification message, the right calculation auxiliary message, the right level, and the hash function. Step S926 is executed to enable the electronic apparatus to perform the same verification pattern calculation as that in the step S912 by the authorization key, the second right token, the right level, and the operation task message to obtain a second verification message.

Then, step S927 is executed to enable the electronic apparatus to determine whether the first verification message is the same as the second verification message. If it is determined in the step S927 that the first verification message is different from the second verification message, then the operation at this stage is ended. If it is determined in the step S927 that the first verification message is the same as the second verification message, then step S928 is executed. Step S928 is executed to enable the electronic apparatus to determine whether the right level and the operation task message conform to a rule of the access right message. If the determination result of the step S928 is "no", then the operation at this stage is ended. If the result of the step S928 is "yes", then the electronic apparatus executes an operation according to the right level and the operation task message.

In addition to the aforesaid steps, the delegation management method of the fifth embodiment can also execute all the operations and functions set forth in the second embodiment. How the fifth embodiment executes these operations and functions can be readily appreciated by those of ordinary skill in the art based on the explanation of the second embodiment, and thus will not be further described herein.

A sixth embodiment of the present invention is a delegation management method, which is also suitable for use in a network system comprising a major management apparatus, an authorized management apparatus, and an electronic apparatus. The steps executed in the sixth embodiment are similar to those executed in the fourth embodiment, so only differences between the two embodiments will be detailed hereinbelow.

Figure 11A:
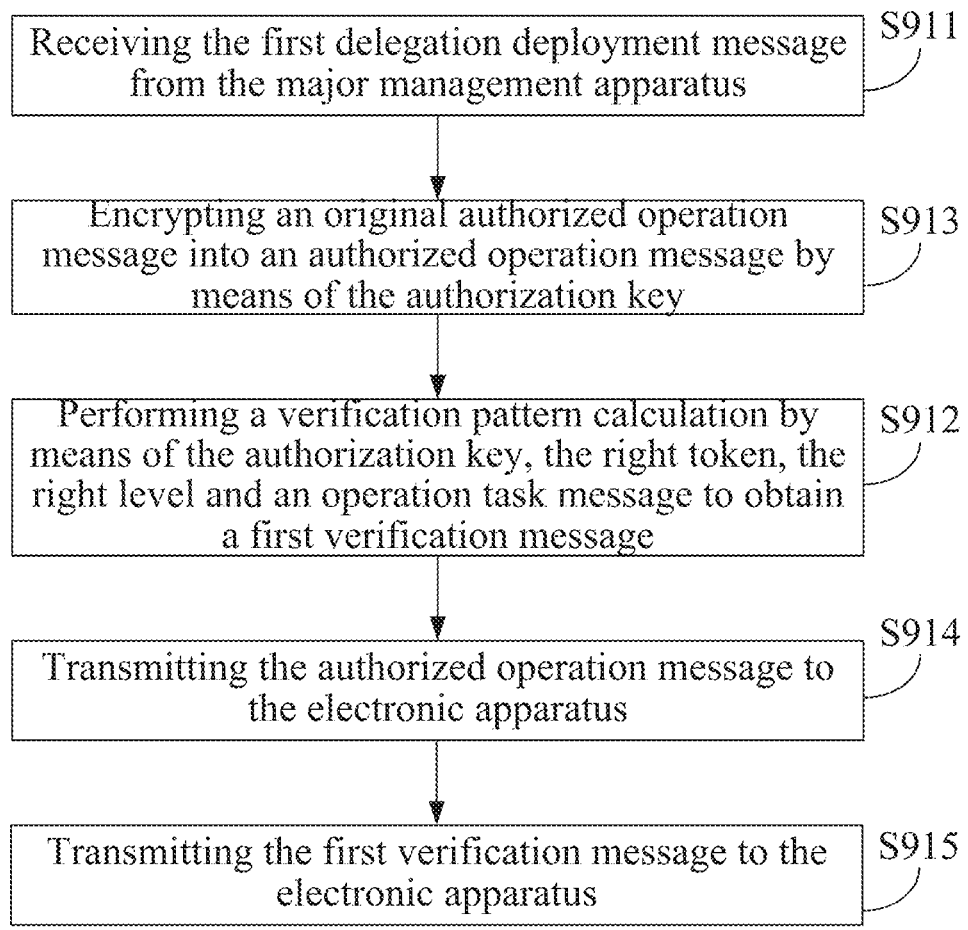
FIG. 11A and FIG. 11B depict the partial flowcharts of a delegation management method according to a sixth embodiment.
Figure 11B:
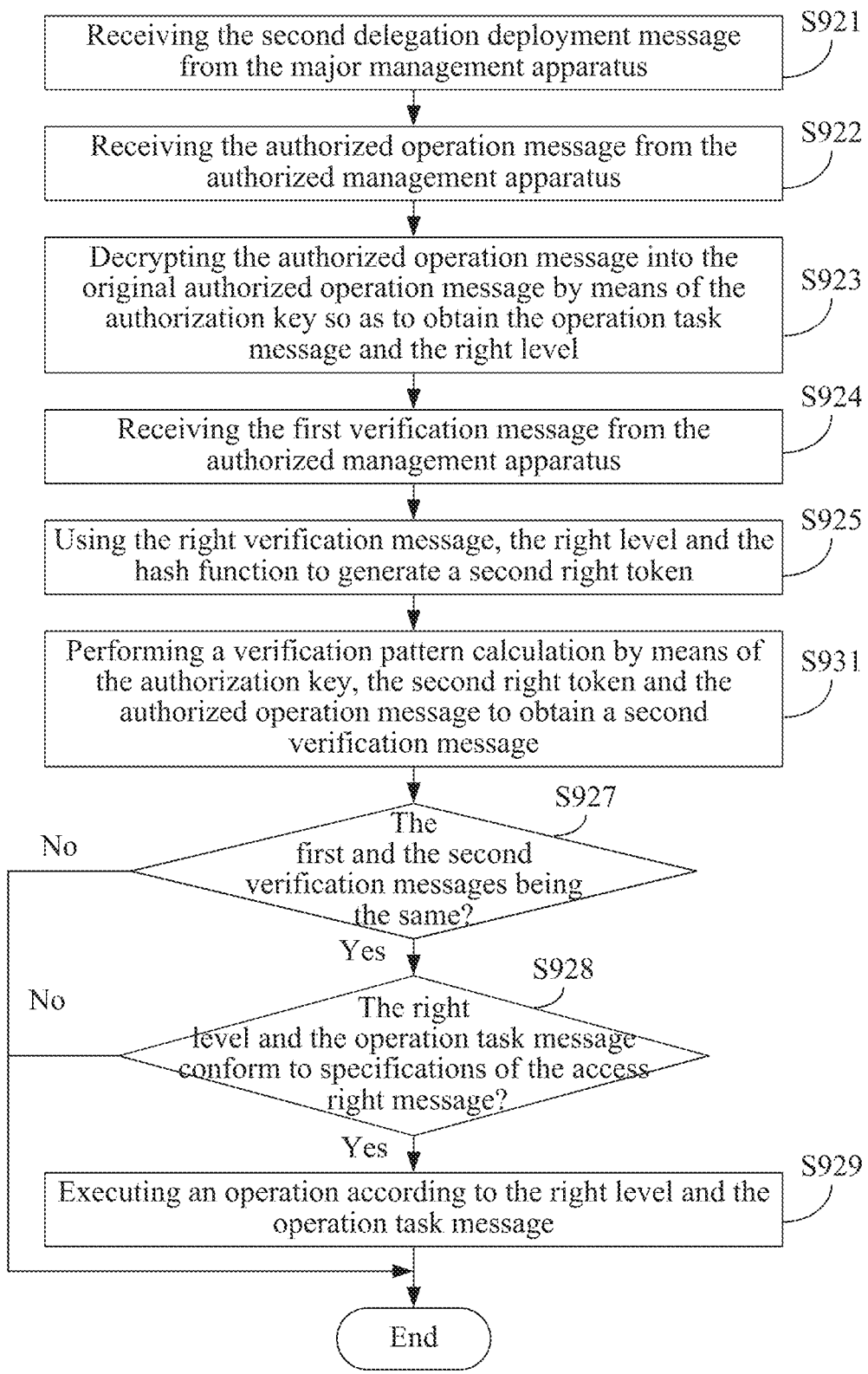

In this embodiment, the major management apparatus also executes the steps as shown in FIG. 9A, which will not be further described herein. FIG. 11A and FIG. 11B depict flowchart diagrams of the delegation management methods executed by the authorized management apparatus and the electronic apparatus of this embodiment respectively.

Please refer to FIG. 11A and FIG. 8A firstly. In this embodiment, the authorized management apparatus firstly executes the step S911, which has been detailed in the fourth embodiment and thus will not be further described herein. Then, step S913 is executed to enable the authorized management apparatus to use the authorization key to encrypt an original authorized operation message into an authorized operation message. The original authorized operation message comprises an operation task message and the right level. Then, step S912 is executed to perform a verification pattern calculation by the authorization key, the first right token, and the authorized operation message to obtain a first verification message. Subsequently, steps S914 and S915 are executed.

Please refer to FIG. 11B and FIG. 8B. In this embodiment, the electronic apparatus firstly executes the step S921 to the step S925, which have been detailed in the fourth embodiment and thus will not be further described herein. Then, step S931 is executed to enable the electronic apparatus to perform a verification pattern calculation by the authorization key, the second right token, and the authorized operation message to obtain a second verification message. Subsequently, steps S927 to S929 are executed.

In addition to the aforesaid steps, the delegation management method of the sixth embodiment can also execute all the operations and functions set forth in the third embodiment. How the sixth embodiment executes these operations and functions can be readily appreciated by those of ordinary skill in the art based on the explanation of the third embodiment, and thus will not be further described herein.

In addition, the delegation management method described in the fourth to the sixth embodiments may be implemented by a computer program product. When the computer program product is loaded into the major management apparatus, the authorized management apparatus and the electronic apparatus and a plurality of codes comprised therein is executed, the delegation management method described in the fourth to the sixth embodiments can be accomplished. The aforesaid computer program product may be stored in a tangible machine-readable medium, such as a read only memory (ROM), a flash memory, a floppy disk, a hard disk, a compact disk, a mobile disk, a magnetic tape, a database accessible to networks, or any other storage media with the same function and well known to those skilled in the art.

According to the present invention, the major management apparatus generates a first delegation deployment message and a second delegation deployment message and transmits the first delegation deployment message and the second delegation deployment message to the authorized management apparatus and the electronic apparatus respectively. Then, when the authorized management apparatus is to access the electronic apparatus, the authorized management apparatus firstly generates an original authorized operation message, and encrypts the original authorized operation message into an authorized operation message. The original authorized operation message comprises an operation task message and a right level, so the electronic apparatus can execute an operation according to the right level and the operation task message. Furthermore, the present invention also provides a plurality of verification procedures, which enable the delegation management operations to proceed more securely.

Through the aforesaid mechanism, the major management apparatus of the present invention can flexibly assign different right levels to the authorized management apparatus according to the needs of practical applications. After being authorized, the authorized management apparatus can manage/access the electronic apparatus according to the assigned right levels. The electronic apparatus can also accurately control and execute the management/access operations of the authorized management apparatus according to the right levels. Therefore, the present invention can solve the problems with the prior art.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. An authorized management apparatus for delegation management, a network system comprising the authorized management apparatus, a major management apparatus, and an electronic apparatus, the authorized management apparatus comprising:

a first transceiving interface, being configured to receive a delegation deployment message from the major management apparatus;

a storage unit, being configured to store an authorization key, a right level, and a right token comprised in the delegation deployment message;

a processing unit, being electrically connected to the first transceiving interface and configured to perform a verification pattern calculation by utilizing the authorization key, the right token, the right level, and an operation task message and encrypt an original authorized operation message into an authorized operation message by the authorization key, wherein the original authorized operation message comprises the operation task message and the right level; and a second transceiving interface, being electrically connected to the processing unit and configured to transmit the authorized operation message to the electronic apparatus so that the electronic apparatus decrypts the authorized operation message into the original authorized operation message by the authorization key, performs a verification procedure by the right level and the operation task message comprised in the original authorized operation message and a right verification message, and executes an operation according to the right level and the operation task message.

2. The authorized management apparatus of claim 1, wherein the operation task message comprises an object code and an operation code.

3. The authorized management apparatus of claim 1, wherein the processing unit performs the verification pattern calculation by the authorization key, the right token, the right level, and the operation task message to obtain a verification message, and the second transceiving interface further transmits the verification message to the electronic apparatus.

4. The authorized management apparatus of claim 1, wherein the processing unit performs the verification pattern calculation by the authorization key, the right token, the right level, and the operation task message to obtain a verification message, and the original authorized operation message further comprises the verification message.

5. The authorized management apparatus of claim 1, wherein the processing unit performs the verification pattern calculation by the authorization key, the right token, and the authorized operation message to obtain a verification message, and the second transceiving interface further transmits the verification message to the electronic apparatus.

6. A delegation management method for an authorized management apparatus, a network system comprising the authorized management apparatus, a major management apparatus, and an electronic apparatus, the delegation management method comprising the following steps of:
  (a) receiving a delegation deployment message from the major management apparatus;
  (b) performing a verification pattern calculation by utilizing an authorization key, a right token, and a right level comprised in the delegation deployment message and an operation task message;
  (c) encrypting an original authorized operation message into an authorized operation message by the authorization key, wherein the original authorized operation message comprises the operation task message and the right level; and
  (d) transmitting the authorized operation message to the electronic apparatus so that the electronic apparatus performs a verification procedure by a right verification message as well as the right level and the operation task message comprised in the original authorized operation message and so that the electronic apparatus executes an operation according to the right level and the operation task message.

7. The delegation management method of claim 6, wherein the operation task message comprises an object code and an operation code.

8. The delegation management method of claim 6, wherein the step (b) performs the verification pattern calculation by the authorization key, the right token, the right level and the operation task message to obtain a verification message, the delegation management method further comprises the following step of:
  transmitting the verification message to the electronic apparatus.

9. The delegation management method of claim 6, wherein the step (b) performs the verification pattern calculation by the authorization key, the right token, the right level, and the operation task message to obtain a verification message and the original authorized operation message further comprises the verification message.

10. The delegation management method of claim 6, wherein the step (b) performs the verification pattern calculation by the authorization key, the right token, and the authorized operation message to obtain a verification message and the delegation management method further comprises the following step of:
  transmitting the verification message to the electronic apparatus.

* * * * *